US008089855B2

(12) United States Patent
Agrawal et al.

(10) Patent No.: US 8,089,855 B2
(45) Date of Patent: Jan. 3, 2012

(54) TRANSMISSION OF OVERHEAD INFORMATION FOR BROADCAST AND MULTICAST SERVICES IN A WIRELESS COMMUNICATION SYSTEM

(75) Inventors: Avneesh Agrawal, San Diego, CA (US); Durga Prasad Malladi, San Diego, CA (US); Anastasios Stamoulis, San Diego, CA (US); Ashok Mantravadi, San Diego, CA (US); Ramaswamy Murali, San Diego, CA (US)

(73) Assignee: Qualcomm Incorporated, San Diego, CA (US)

( * ) Notice: Subject to any disclaimer, the term of this patent is extended or adjusted under 35 U.S.C. 154(b) by 1059 days.

(21) Appl. No.: 11/144,846

(22) Filed: Jun. 2, 2005

(65) Prior Publication Data

US 2006/0018269 A1 Jan. 26, 2006

Related U.S. Application Data

(60) Provisional application No. 60/577,083, filed on Jun. 4, 2004.

(51) Int. Cl.
*H04J 11/00* (2006.01)
(52) U.S. Cl. ........ 370/208; 370/203; 370/210; 370/390; 370/432; 370/321
(58) Field of Classification Search .................. 370/208, 370/355, 321; 455/552.1
See application file for complete search history.

(56) References Cited

U.S. PATENT DOCUMENTS

| 4,558,322 A | 12/1985 | Tomasi |
| 4,914,651 A | 4/1990 | Lusignan |
| 5,602,868 A | 2/1997 | Wilson |
| 5,699,363 A | 12/1997 | Wishart et al. |
| 5,867,478 A | 2/1999 | Baum et al. |
| 5,943,344 A * | 8/1999 | Keller et al. .................. 370/468 |

(Continued)

FOREIGN PATENT DOCUMENTS

CA 2314404 A1 1/2002

(Continued)

OTHER PUBLICATIONS

"MCCH Information Transmision"—LG Electronics Inc.—Malaga, Spain Feb. 16-20, 2004.*

(Continued)

*Primary Examiner* — Derrick Ferris
*Assistant Examiner* — Christopher R Crompton
(74) *Attorney, Agent, or Firm* — Larry Moskowitz

(57) ABSTRACT

To transmit overhead information for broadcast and multicast services in a system that utilizes multiple radio technologies, time slots used for OFDM in a super-frame are initially ascertained. Overhead information for multiple streams to be sent in the time slots used for OFDM is generated. The overhead information conveys the time slots and the coding and modulation used for the streams and may be given in various forms. Multiple records may be formed for the overhead information for the streams. The overhead information for the streams is processed and time division multiplexed with the data for the streams in the super-frame. Information indicating the time slots used for OFDM in the super-frame may be sent separately or included in the overhead information. An indicator may also be appended to each stream to indicate whether there is any change in the overhead information for the stream in the next super-frame.

34 Claims, 13 Drawing Sheets

U.S. PATENT DOCUMENTS

| | | | |
|---|---|---|---|
| 6,031,874 | A | 2/2000 | Chennakeshu et al. |
| 6,115,354 | A | 9/2000 | Weck |
| 6,366,309 | B1 | 4/2002 | Siegle |
| 6,470,024 | B1 | 10/2002 | Hamalainen et al. |
| 6,567,375 | B2 | 5/2003 | Balachandran et al. |
| 6,594,473 | B1 | 7/2003 | Dabak et al. |
| 6,661,771 | B1 | 12/2003 | Cupo et al. |
| 6,747,948 | B1 | 6/2004 | Sarraf et al. |
| 6,788,661 | B1 | 9/2004 | Ylitalo et al. |
| 6,795,419 | B2 | 9/2004 | Parantainen et al. |
| 6,842,487 | B1 | 1/2005 | Larsson |
| 6,853,629 | B2 | 2/2005 | Alamouti et al. |
| 6,885,630 | B2 | 4/2005 | Kostic et al. |
| 6,909,702 | B2 | 6/2005 | Leung et al. |
| 6,927,728 | B2 | 8/2005 | Vook et al. |
| 6,940,824 | B2 | 9/2005 | Shibutani |
| 6,940,827 | B2 | 9/2005 | Li et al. |
| 6,961,388 | B2 | 11/2005 | Ling et al. |
| 6,999,467 | B2 | 2/2006 | Krauss et al. |
| 7,027,523 | B2 | 4/2006 | Jalali et al. |
| 7,099,270 | B2 | 8/2006 | Yamaguchi |
| 7,110,387 | B1 | 9/2006 | Kim et al. |
| 7,139,237 | B2 | 11/2006 | Nangia et al. |
| 7,181,170 | B2 | 2/2007 | Love et al. |
| 7,273,869 | B2 | 9/2007 | Lindsley et al. |
| 7,280,552 | B2 | 10/2007 | Isson |
| 7,292,651 | B2 | 11/2007 | Li |
| 7,313,118 | B2 | 12/2007 | Geers |
| 7,379,416 | B2 | 5/2008 | Yang et al. |
| 7,391,715 | B2 | 6/2008 | Lee et al. |
| 7,433,418 | B1 | 10/2008 | Dogan et al. |
| 7,436,903 | B2 | 10/2008 | Sandhu et al. |
| 7,471,729 | B2 | 12/2008 | Miyoshi |
| 7,483,366 | B2 | 1/2009 | Joo et al. |
| 7,706,346 | B2 | 4/2010 | Huo et al. |
| 2002/0086691 | A1* | 7/2002 | Kostic et al. ............ 455/503 |
| 2002/0141447 | A1 | 10/2002 | Leung et al. ............ 370/469 |
| 2002/0159422 | A1 | 10/2002 | Li et al. |
| 2003/0002450 | A1 | 1/2003 | Jalali et al. |
| 2003/0002518 | A1 | 1/2003 | Shibutani |
| 2003/0043928 | A1 | 3/2003 | Ling et al. |
| 2003/0072255 | A1* | 4/2003 | Ma et al. ............ 370/208 |
| 2003/0074476 | A1 | 4/2003 | Kim et al. |
| 2003/0081538 | A1 | 5/2003 | Walton et al. |
| 2003/0137926 | A1 | 7/2003 | Joo et al. |
| 2003/0152043 | A1 | 8/2003 | Geers |
| 2003/0156570 | A1 | 8/2003 | Alamouti et al. |
| 2003/0174642 | A1 | 9/2003 | Yang et al. |
| 2003/0174645 | A1 | 9/2003 | Paratainen et al. ........ 370/229 |
| 2003/0227866 | A1 | 12/2003 | Yamaguchi |
| 2004/0086055 | A1 | 5/2004 | Li |
| 2004/0178954 | A1 | 9/2004 | Vook et al. |
| 2004/0213145 | A1 | 10/2004 | Nakamura |
| 2004/0228294 | A1* | 11/2004 | Kim et al. ............ 370/312 |
| 2005/0014464 | A1 | 1/2005 | Larsson |
| 2005/0047481 | A1 | 3/2005 | Lyle et al. |
| 2005/0063345 | A1* | 3/2005 | Wu et al. ............ 370/335 |
| 2005/0163258 | A1 | 7/2005 | Gore et al. |
| 2005/0249177 | A1 | 11/2005 | Huo et al. |
| 2005/0276344 | A1 | 12/2005 | Ling et al. |
| 2007/0070944 | A1 | 3/2007 | Rinne et al. |
| 2007/0189404 | A1 | 8/2007 | Baum et al. |

FOREIGN PATENT DOCUMENTS

| | | |
|---|---|---|
| CA | 2354196 A1 | 1/2003 |
| DE | 04425713 | 7/1995 |
| EP | 0588741 | 3/1994 |
| EP | 1061687 A1 | 12/2000 |
| EP | 1065855 | 1/2001 |
| EP | 1109365 A1 | 6/2001 |
| EP | 1148673 | 10/2001 |
| EP | 1387545 | 2/2004 |
| GB | 2394871 | 5/2004 |
| JP | 7245574 | 9/1995 |
| JP | 2000236343 | 8/2000 |
| JP | 2001511966 T | 8/2001 |
| JP | 2001320346 A | 11/2001 |
| JP | 2001358694 A | 12/2001 |
| JP | 2003018647 A | 1/2003 |
| JP | 200432380 | 1/2004 |
| JP | 2004064654 A | 2/2004 |
| JP | 2004096186 | 3/2004 |
| JP | 2004096445 A | 3/2004 |
| JP | 2004507121 | 3/2004 |
| JP | 2004158901 A | 6/2004 |
| JP | 2004159303 | 6/2004 |
| JP | 2004533746 | 11/2004 |
| JP | 2007518290 T | 7/2007 |
| JP | 2008502224 T | 1/2008 |
| JP | 2008502225 T | 1/2008 |
| KR | 1020040011653 | 2/2004 |
| WO | 9730531 | 8/1997 |
| WO | WO9824250 A2 | 6/1998 |
| WO | WO9959278 A1 | 11/1999 |
| WO | WO004728 A2 | 1/2000 |
| WO | WO011626 A1 | 1/2001 |
| WO | WO0135537 A2 | 5/2001 |
| WO | 0161899 | 8/2001 |
| WO | 02004086 | 1/2002 |
| WO | 02005004 | 1/2002 |
| WO | 0211317 | 2/2002 |
| WO | 0221715 | 3/2002 |
| WO | 0235735 | 5/2002 |
| WO | WO02062002 A1 | 8/2002 |
| WO | WO02073831 A1 | 9/2002 |
| WO | 02082834 | 10/2002 |
| WO | WO03034642 A2 | 4/2003 |
| WO | WO03034645 A1 | 4/2003 |
| WO | WO03047140 A1 | 6/2003 |
| WO | WO2004036767 | 4/2004 |
| WO | WO2004068780 A1 | 8/2004 |
| WO | 2004086711 | 10/2004 |
| WO | 2005004428 | 1/2005 |
| WO | 2005022811 | 3/2005 |
| WO | 2005071867 | 8/2005 |

OTHER PUBLICATIONS

"Introduction of Multimedia Broadcast/Multicast Service (MBMS) in the Radio Access Network (RAN)", ETSI-3GPP, version 6.1, Jul. 2004, pp. 1-52.*

International Search Report—PCT/US05/019541, International Search Authority-European Patent Office, Sep. 28, 2005.

International Preliminary Report—PCT/US05/019541, International Search Authority—IPEA/US-Alexandria,Virginia, Mar. 16, 2006.

Written Opinion—PCT/US05/019541, International Search Authority-European Patent Office-Sep. 28, 2005.

"3rd Generation Partnership Project 2 '3GPP2' CDMA2000 High Rate Packet Data Air Interface Specification," 3GPP2 C.S0024 Version 3.0, Dec. 5, 2001.

3GPP2, CDMA2000 High Rate Packed Data Air Interface Specification, Sep. 12, 2000, sections 7-1 to 7-30.

Alasti et al., "A Discrete Multi Carrier Multiple Access Technique for Wireless Communications." Vehicular Technology Conference, vol. 2, May 18, 1998, pp. 1533-1537. New York, US.

Dammann et al., "Transmit/Receive-Antenna Diversity Techniques for OFDM Systems." European Transactions on Telecommunications, vol. 13, No. 5, Sep. 2002, pp. 531-538, Milano, IT.

Shaoping Chen et al., "A Space-Time Coding Scheme with Maximum Diversity Gains Over Frequency-Selective Fading Channels." Personal, Indoor and Mobile Radio Communications, vol. 2, Sep. 7, 2003-Sep. 10, 2003, pp. 2567-2570, Piscataway, NJ.

Weck C., "Coverage Aspects of Digital Terrestrial Television Broadcasting" EBU Review-Technical, European Broadcasting Union, No. 270, Dec. 21, 1996, pp. 19-30.

Van Duc Nguyen et al., "Performance of Channel Estimation Using Pilot Symbols for a Coherent OFDM System" International Symposium on Wireless Personal Multimedia Communications, vol. 2, Nov. 12, 2000, pp. 842-847.

International Search Report and Written Opinion—PCT/US05/019529, International Search Authority—European Patent Office, Oct. 11, 2005.

International Search Report and Written Opinion—PCT/US05/019542, International Search Authority—US, Oct. 5, 2005.

International Search Report and Written Opinion—PCT/US05/019543, International Search Authority—European Patent Office, Sep. 27, 2005.

International Search Report and Written Opinion—PCT/US05/019544, International Search Authority—European Patent Office, Dec. 12, 2005.

* cited by examiner

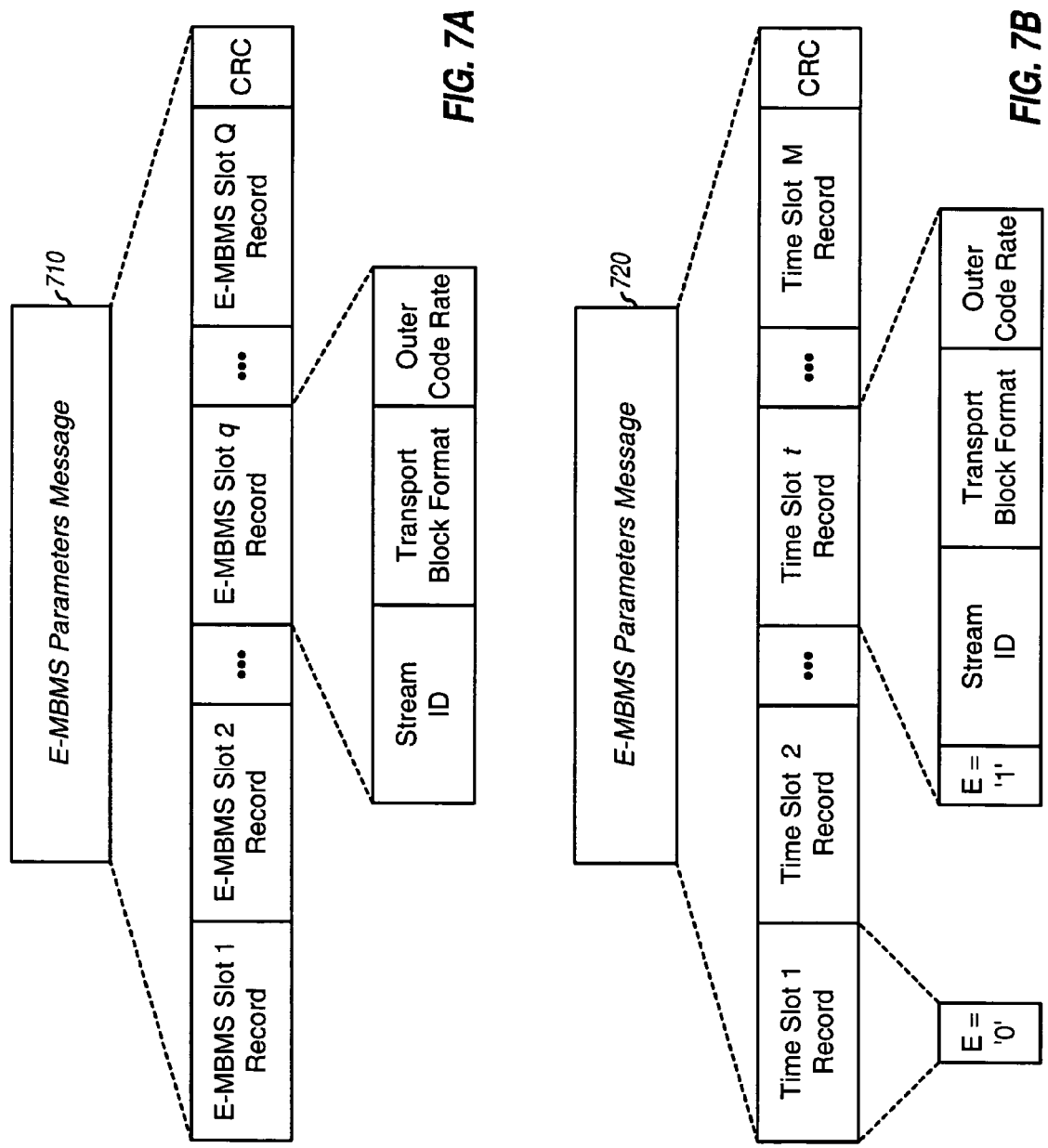

TRANSMISSION OF OVERHEAD INFORMATION FOR BROADCAST AND MULTICAST SERVICES IN A WIRELESS COMMUNICATION SYSTEM

CLAIM OF PRIORITY UNDER 35 U.S.C. §119

The present Application for Patent claims priority to Provisional Application Ser. No. 60/577,083, entitled "FLO-TDD physical layer," filed Jun. 4, 2004, assigned to the assignee hereof, and expressly incorporated herein by reference.

BACKGROUND

1. Field

The present invention relates generally to communication, and more specifically to techniques for transmitting overhead information in a wireless communication system.

2. Background

Wireless communication systems are widely deployed to provide various communication services such as voice, packet data, multi-media broadcast, text messaging, and so on. These systems may be multiple-access systems capable of supporting communication for multiple users by sharing the available system resources. Examples of such multiple-access systems include Code Division Multiple Access (CDMA) systems, Time Division Multiple Access (TDMA) systems, Frequency Division Multiple Access (FDMA) systems, and Orthogonal Frequency Division Multiple Access (OFDMA) systems. A CDMA system may implement Wideband CDMA (W-CDMA), cdma2000, and so on. W-CDMA is described in documents from a consortium named "3rd Generation Partnership Project" (3GPP). cdma2000 is described in documents from a consortium named "3rd Generation Partnership Project 2" (3GPP2). 3GPP and 3GPP2 documents are publicly available.

W-CDMA and cdma2000 employ direct sequence CDMA (DS-CDMA), which spectrally spreads a narrowband signal over the entire system bandwidth with a spreading code. DS-CDMA has certain advantages such as ease of supporting multiple access, narrowband rejection, and so on. However, DS-CDMA is susceptible to frequency selective fading, which causes intersymbol interference (ISI). A complicated receiver with an equalizer may be needed to combat the intersymbol interference.

A wireless communication system may send various types of transmissions such as a user-specific or unicast transmission for a specific user, a multicast transmission for a group of users, and a broadcast transmission for all users within a broadcast coverage area. The multicast and broadcast transmissions may be variable in nature, e.g., sent at variable data rates that change over time. In this case, overhead/control information for the multicast and broadcast transmissions may be sent on a control channel to indicate when and how each transmission is sent. Depending on how the control channel is transmitted, a terminal may need to continuously decode the control channel in order to obtain control information for each transmission of interest. This continuous decoding of the control channel can deplete battery power and is undesirable.

There is therefore a need in the art for techniques to send overhead information such that a terminal can efficiently receive transmissions of interest with reduced power consumption.

SUMMARY

Techniques for transmitting overhead information in a wireless communication system that utilizes multiple radio technologies such as W-CDMA and Orthogonal Frequency Division Multiplexing (OFDM) are described herein. These techniques may be used for various types of transmissions (e.g., user-specific, multicast, and broadcast transmissions) and for various services (e.g., Enhanced Multimedia Broadcast/Multicast Service (E-MBMS)).

According to an embodiment of the invention, an apparatus is described which includes a controller and a processor. The controller ascertains time slots used for a first radio technology (e.g., OFDM) among at least two radio technologies (e.g., W-CDMA and OFDM) utilized by the system and generates overhead information for multiple streams to be sent in the time slots used for the first radio technology. The overhead information for each stream indicates the time slots allocated to the stream and typically further conveys coding and modulation parameters used for the stream. The processor processes the overhead information for the multiple streams for transmission via a wireless channel.

According to another embodiment, a method is provided in which time slots used for a first radio technology among at least two radio technologies are ascertained. Overhead information for multiple streams to be sent in the time slots used for the first radio technology is determined and processed for transmission.

According to yet another embodiment, an apparatus is described which includes means for ascertaining time slots used for a first radio technology among at least two radio technologies, means for determining overhead information for multiple streams to be sent in the time slots used for the first radio technology, and means for processing the overhead information for the multiple streams for transmission.

According to yet another embodiment, an apparatus is described which includes a controller and a processor. The controller ascertains time slots used for OFDM in a super-frame comprised of multiple time slots. The controller further determines overhead information for multiple streams to be sent in the time slots used for OFDM. The overhead information for each stream indicates at least one time slot allocated to the stream in the super-frame. The processor processes the overhead information for the multiple streams and time division multiplexes the processed overhead information with data for the multiple streams in the super-frame.

According to yet another embodiment, a method is provided in which time slots used for OFDM in a super-frame are ascertained. Overhead information for multiple streams to be sent in the time slots used for OFDM is determined, processed, and time division multiplexed with data for the multiple streams in the super-frame.

According to yet another embodiment, an apparatus is described which includes means for ascertaining time slots used for OFDM in a super-frame, means for determining overhead information for multiple streams to be sent in the time slots used for OFDM, and means for time division multiplexing the overhead information for the multiple streams with data for the multiple streams in the super-frame.

According to yet another embodiment, an apparatus is described which includes a controller and a processor. The controller obtains overhead information for multiple streams transmitted in time slots used for a first radio technology among at least two radio technologies. The processor processes at least one time slot for a selected stream to obtain data for the stream.

According to yet another embodiment, a method is provided in which overhead information for multiple streams transmitted in time slots used for a first radio technology among at least two radio technologies is obtained. At least one time slot for a selected stream is processed to obtain data for the stream.

According to yet another embodiment, an apparatus is described which includes means for obtaining overhead information for multiple streams transmitted in time slots used for a first radio technology among at least two radio technologies, and means for processing at least one time slot for a selected stream to obtain data for the stream.

Various aspects and embodiments of the invention are described in further detail below.

BRIEF DESCRIPTION OF THE DRAWINGS

FIGS. 7A, 7B and 7C show three embodiments of an E-MBMS Parameters Message that carries overhead information for the streams sent with OFDM.

DETAILED DESCRIPTION

The word "exemplary" is used herein to mean "serving as an example, instance, or illustration." Any embodiment described herein as "exemplary" is not necessarily to be construed as preferred or advantageous over other embodiments.

Figure 1:
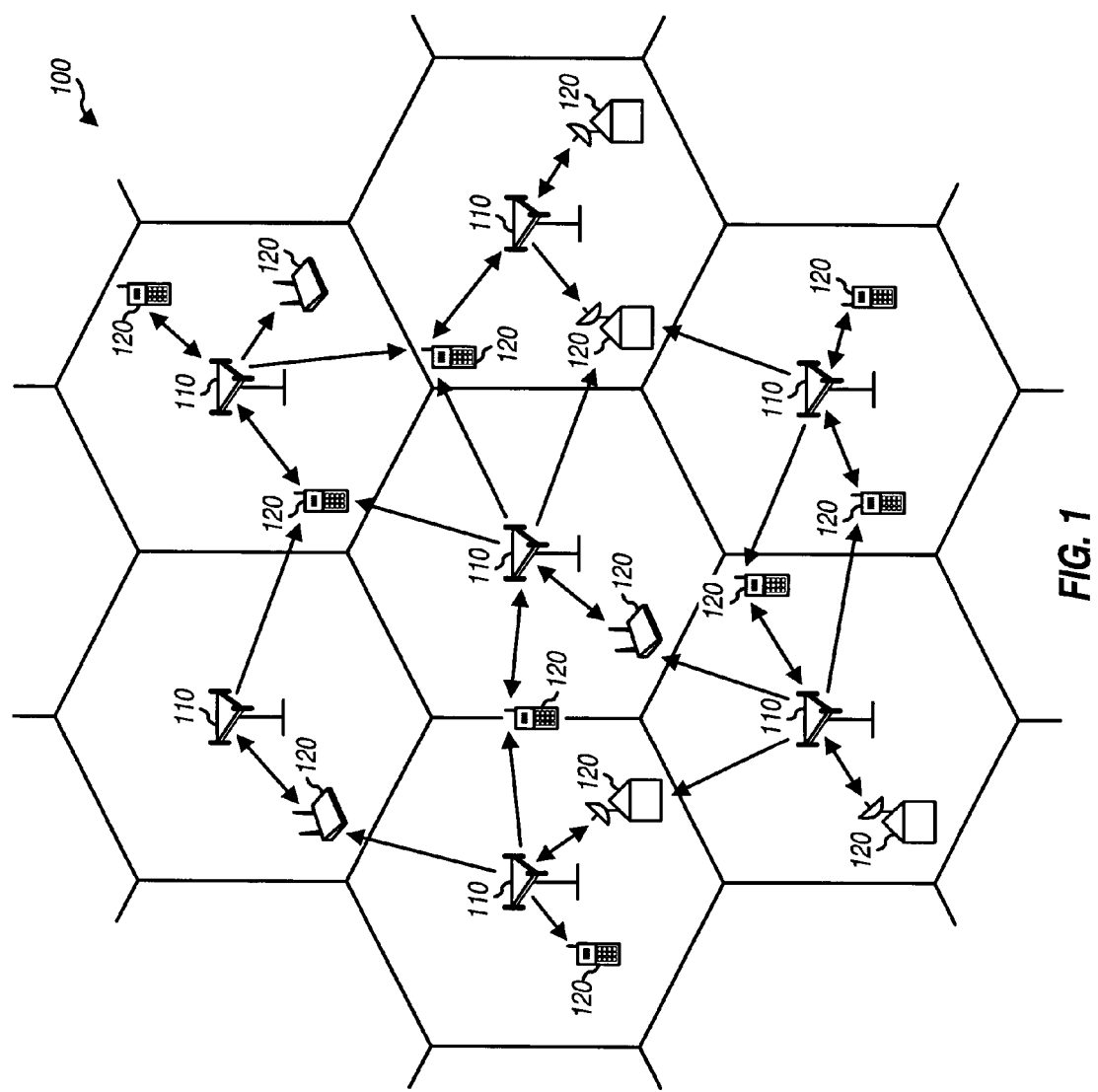
FIG. 1 shows a wireless communication system.

FIG. 1 shows a wireless communication system 100 with multiple base stations 110 and multiple terminals 120. A base station is generally a fixed station that communicates with the terminals and may also be called a Node B, an access point, a base transceiver subsystem (BTS), or some other terminology. Each base station 110 provides communication coverage for a particular geographic area. The term "cell" can refer to a base station and/or its coverage area depending on the context in which the term is used.

Terminals 120 may be dispersed throughout the system. A terminal may be fixed or mobile and may also be called a mobile station, a wireless device, a user equipment, a user terminal, a subscriber unit, or some other terminology. The terms "terminal" and "user" are used interchangeably herein. A terminal may communicate with zero, one, or multiple base stations on the downlink and/or uplink at any given moment. The downlink (or forward link) refers to the communication link from the base stations to the terminals, and the uplink (or reverse link) refers to the communication link from the terminals to the base stations.

The base stations may broadcast various contents (e.g., audio, video, tele-text, data, video/audio clips, and so on) in different types of transmissions. A wide-area transmission is a transmission that is broadcast by all or many base stations in the system. Different wide-area transmissions may be broadcast by different groups of base stations in the system. A local transmission is a transmission that is broadcast by a subset of the base stations for a given wide-area transmission. Different local transmissions may be broadcast by different subsets of the base stations for the given wide-area transmission. The local and wide-area transmissions may be viewed as transmissions having different tiers of coverage. The coverage area for each transmission is determined by the coverage areas for all base stations broadcasting that transmission.

Figure 2:
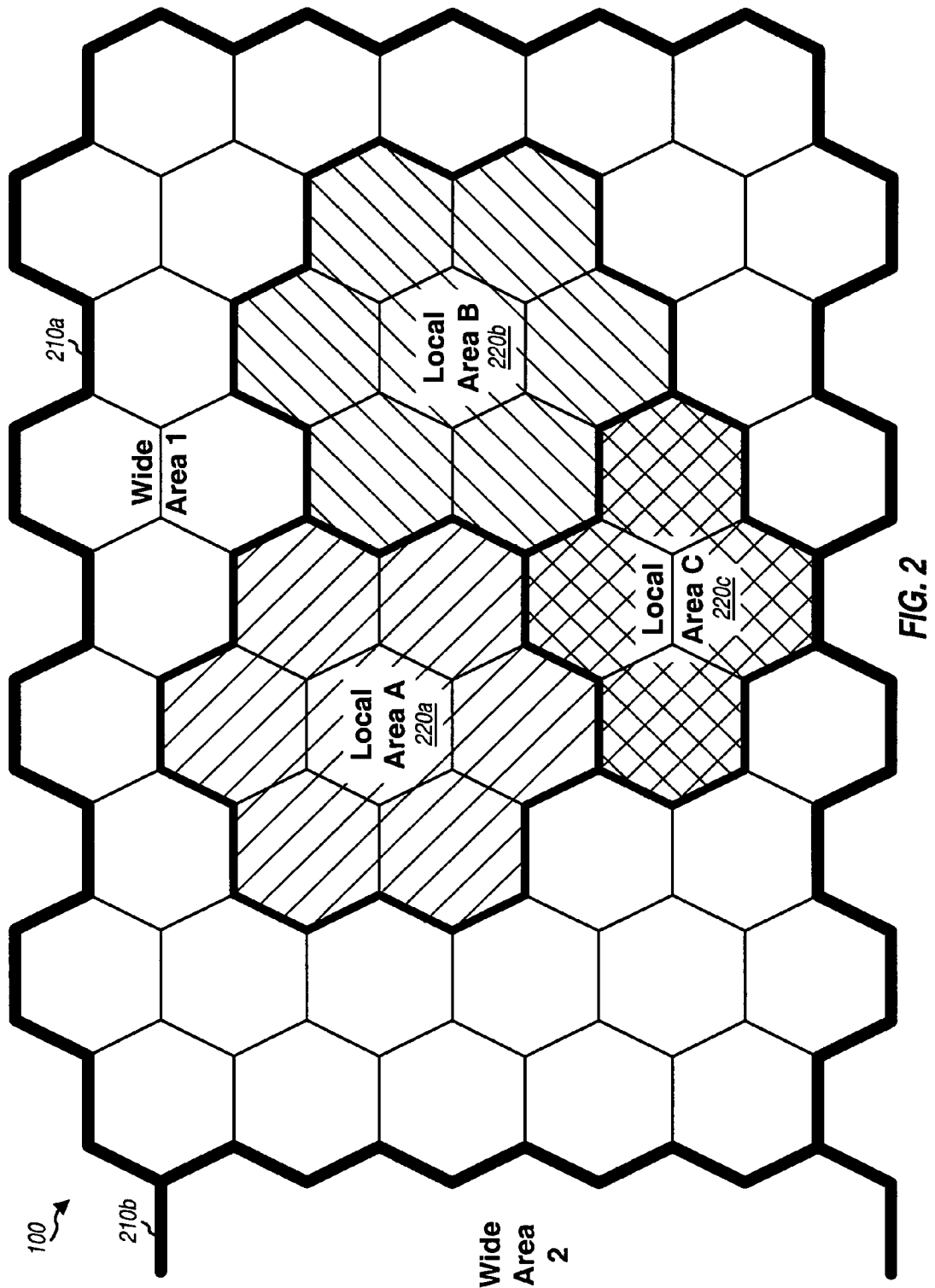
FIG. 2 shows local and wide coverage areas for the system in FIG. 1.

FIG. 2 shows different coverage areas for system 100. In this example, the system includes wide areas 210a and 210b, with wide area 210a encompassing three local areas 220a, 220b, and 220c. In general, the system may include any number of wide areas and any number of local areas. Each local area may adjoin another local area or may be isolated. A wide-area transmission for a given wide area is broadcast by all base stations in that wide area. A local transmission for a given local area is broadcast by all base stations in that local area.

The overhead transmission techniques described herein may be used with various radio technologies such as W-CDMA, cdma2000, IS-856, other versions of CDMA, OFDM, Interleaved FDMA (IFDMA) (which is also called Distributed FDMA), Localized FDMA (LFDMA) (which is also called Narrowband FDMA or Classical FDMA), Global System for Mobile Communications (GSM), direct sequence spread spectrum (DSSS), frequency hopping spread spectrum (FHSS), and so on. OFDM, IFDMA, and LFDMA are multi-carrier radio technologies that effectively partition the overall system bandwidth into multiple (S) orthogonal frequency subbands. These subbands are also called tones, subcarriers, bins, and frequency channels. Each subband is associated with a respective subcarrier that may be modulated with data. OFDM transmits modulation symbols in the frequency domain on all or a subset of the S subbands. IFDMA transmits modulation symbols in the time domain on subbands that are uniformly spaced across the S subbands. LFDMA transmits modulation symbols in the time domain and typically on adjacent subbands. The use of OFDM for unicast, multicast, and broadcast transmissions may also be considered as different radio technologies. The list of radio technologies given above is not exhaustive, and the frame structures and transmission techniques may also be used for other radio technologies not mentioned above. For clarity, the overhead transmission techniques are specifically described below for W-CDMA and OFDM.

Figure 3:
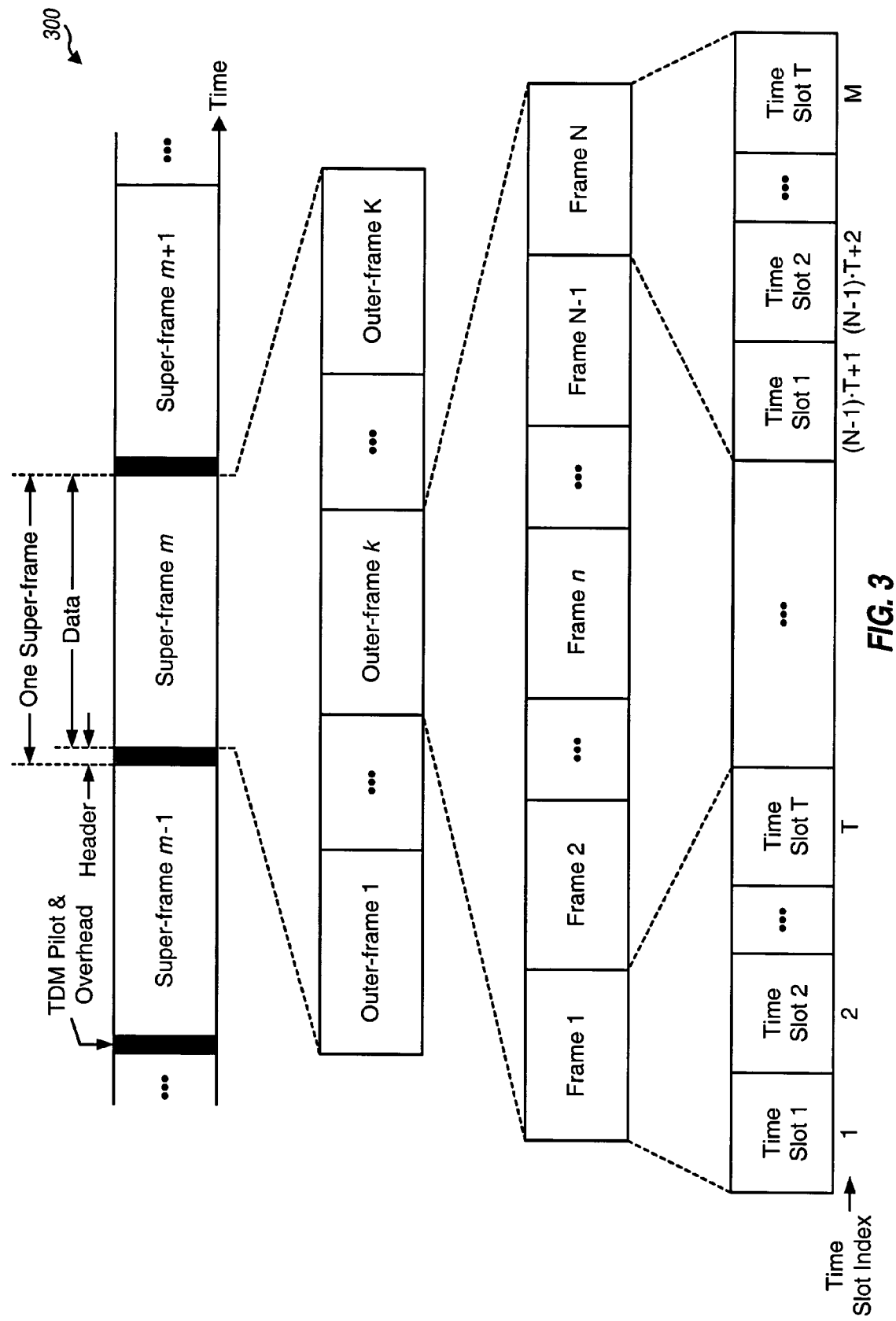
FIG. 3 shows a 4-tier frame structure that supports W-CDMA and OFDM.

FIG. 3 shows an exemplary 4-tier frame structure 300 that supports multiple radio technologies such as W-CDMA and OFDM. The transmission time line is partitioned into super-frames, with each super-frame having a predetermined time duration, e.g., approximately one second. For the embodiment shown in FIG. 3, each super-frame includes (1) a header field for a time division multiplexed (TDM) pilot and overhead information and (2) a data field for traffic data and a frequency division multiplexed (FDM) pilot. The TDM pilot may be used for synchronization, e.g., super-frame detection, frequency error estimation, and timing acquisition. The TDM and FDM pilots may be used for channel estimation. The overhead information for each super-frame conveys various parameters for the physical channels sent in that super-frame.

The data field of each super-frame is partitioned into K equal-size outer-frames to facilitate data transmission, where K>1. Each outer-frame is partitioned into N frames, and each frame is further partitioned into T time slots, where N>1 and T>1. Each outer-frame thus includes M=N·T time slots that are assigned indices of 1 through M. In general, a super-frame may include any number of outer-frames, frames, and time slots. The super-frame, outer-frame, frame, and time slot may also be referred to by some other terminology.

In general, a frame structure with any number of tiers may be used to support multiple radio technologies. For clarity, much of the following description is for the 4-tier frame structure shown in FIG. 3. The frame structure may be used for both time division duplexed (TDD) and frequency division duplexed (FDD) systems. In a TDD system, the downlink and uplink share the same frequency band, and downlink and uplink transmissions are sent in different time slots. In an FDD system, the downlink and uplink are allocated separate frequency bands, and downlink and uplink transmissions may be sent simultaneously on the two frequency bands.

Figure 4:
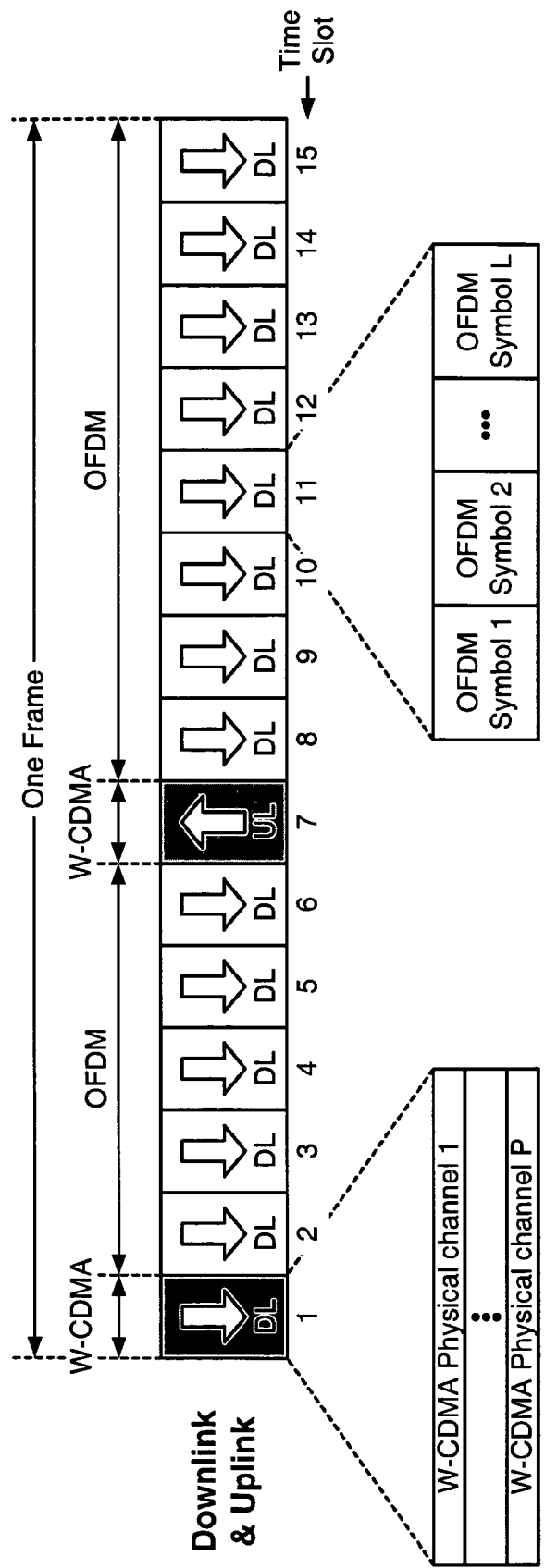
FIG. 4 shows multiplexing of W-CDMA and OFDM in a frame.

FIG. 4 shows an exemplary multiplexing of W-CDMA and OFDM in a frame for a TDD system. In general, each time slot in the frame may be used for either the downlink (DL) or uplink (UL). A time slot used for the downlink is called a downlink slot, and a time slot used for the uplink is called an uplink slot. Any radio technology (e.g., W-CDMA or OFDM) may be used for each time slot. A time slot used for W-CDMA is called a W-CDMA slot, and a time slot used for OFDM is called an OFDM slot. A time slot used for the downlink with OFDM is called an E-MBMS slot, a forward link only (FLO) slot, or some other terminology. For the example shown in FIG. 4, time slot 1 is a downlink W-CDMA slot, time slots 2 through 6 are E-MBMS slots, time slot 7 is an uplink W-CDMA slot, and time slot 8 through 15 are E-MBMS slots. An E-MBMS slot may be used to send a multicast transmission, a broadcast transmission, or a unicast transmission.

For each W-CDMA slot, data for one or more physical channels may be channelized with different orthogonal (e.g., OVSF) codes, spectrally spread with scrambling codes, combined in the time domain, and transmitted across the entire W-CDMA slot. For each OFDM slot, data for one or more physical channels may be processed and converted to L OFDM symbols, which are transmitted in that OFDM slot, where $L \geq 1$.

Table 1 shows three exemplary designs for the frame structure shown in FIG. 3. For these frame designs, the header field for the TDM pilot and overhead information is 40 milliseconds (ms), each super-frame contains four outer-frames (K=4), the frames and time slots conform to W-CDMA, and two time slots in each frame are reserved for W-CDMA. For W-CDMA, each frame has a duration of 10 ms and contains 15 time slots (T=15), each time slot has a duration of 0.667 ms and contains 2560 chips, and each chip has a duration of 0.26 microseconds (μs) for a system bandwidth of 3.84 MHz. The number of time slots per outer-frame (M) is equal to the number of time slots per frame (T) times the number of frames per outer-frame (N), or M=T×N. The maximum number of E-MBMS slots per outer-frame (V) is equal to the maximum number of E-MBMS slots per frame (13) times the number of frames per outer-frame (N), or V=13×N. Other frame designs with other values for K, N, T, M and V may also be used and are within the scope of the invention.

TABLE 1

| Parameters | Frame Design 1 | Frame Design 2 | Frame Design 3 |
| --- | --- | --- | --- |
| Super-frame duration | 1320 ms | 1280 ms | 1000 ms |
| TDM pilot and overhead duration | 40 ms | 40 ms | 40 ms |
| Outer-frame duration | 320 ms | 310 ms | 240 ms |
| Frame duration | 10 ms | 10 ms | 10 ms |
| Number of frames/outer-frame | N = 32 | N = 31 | N = 24 |
| Number of time slots/frame | T = 15 | T = 15 | T = 15 |
| Number of time slots/outer-frame | M = 480 | M = 465 | M = 360 |

TABLE 1-continued

| Parameters | Frame Design 1 | Frame Design 2 | Frame Design 3 |
| --- | --- | --- | --- |
| Max number of E-MBMS slots/outer-frame | V = 416 | V = 403 | V = 312 |

The system may define physical channels to facilitate transmission of data. A physical channel is a means for sending data at a physical layer and may also be called a physical layer channel, a traffic channel, and so on. A physical channel that is transmitted on the downlink using OFDM is called an E-MBMS physical channel. E-MBMS physical channels may be used to send various types of data (e.g., multicast data, broadcast data, control data, and so on) and may be used for various services (e.g., E-MBMS).

Figure 5:
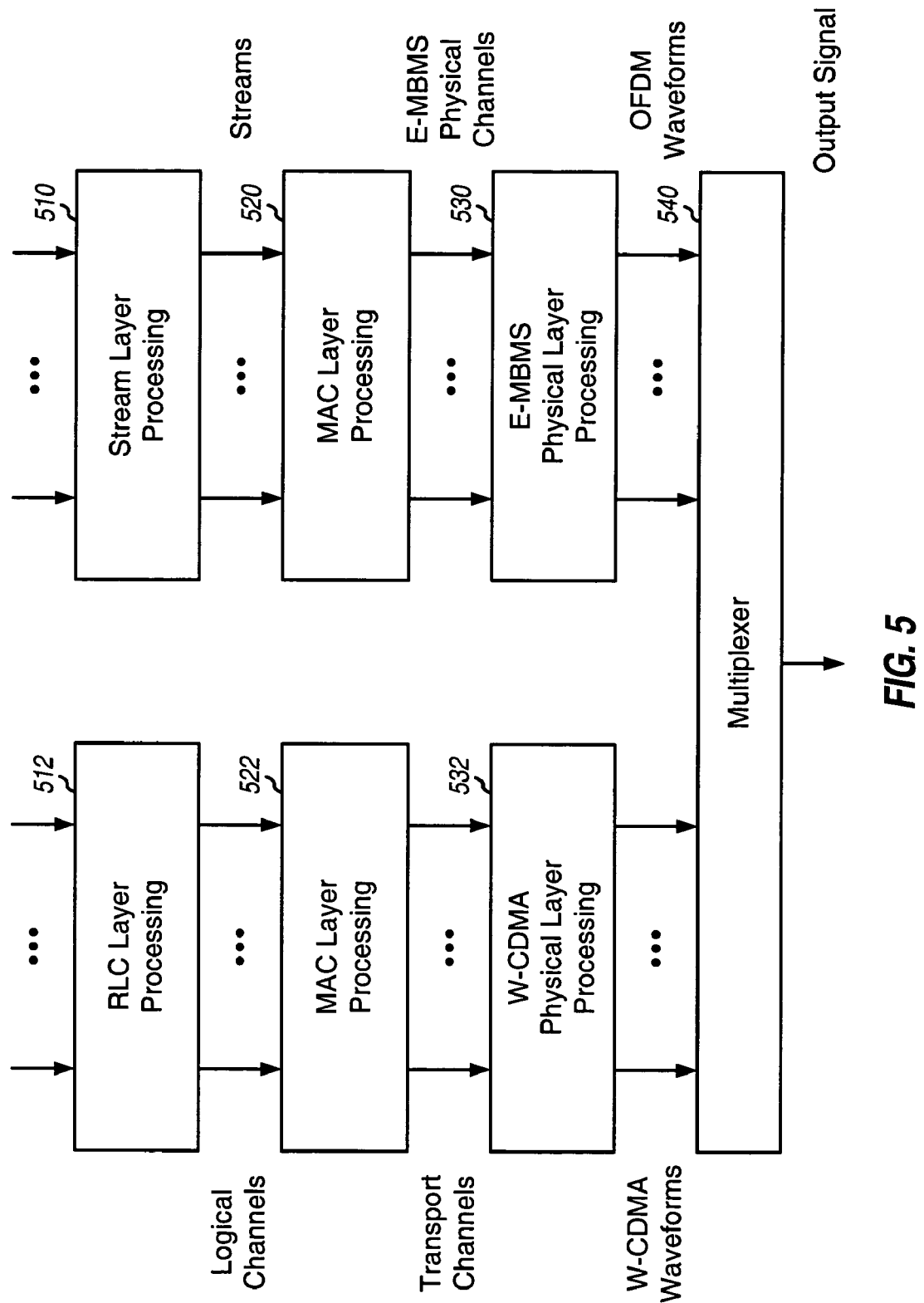
FIG. 5 shows the processing for W-CDMA and OFDM.

FIG. 5 shows an embodiment of the processing for E-MBMS and W-CDMA.

For E-MBMS, a stream layer 510 receives and processes data and signaling from higher layer and provides multiple streams of data. Each stream may carry one or more types of media (e.g., video, audio, datacast, multicast, and so on). In an embodiment, for each super-frame, the stream layer provides one transport block for each stream to be sent in that super-frame. A medium access control (MAC) layer 520 processes the transport blocks for the streams for transmission on E-MBMS physical channels. The MAC layer may form a MAC capsule for each transport block. A physical layer 530 processes the MAC capsules for the E-MBMS physical channels and generates OFDM waveforms.

For W-CDMA, a radio link control (RLC) layer 512 processes data and signaling from upper layer and maps the RLC layer data to logical channels. A MAC layer 522 processes the logical channel data and maps the MAC layer data to transport channels. A physical layer 532 processes the transport channel data, maps the processed data to physical channels, and further generates W-CDMA waveforms. A multiplexer 540 multiplexes W-CDMA waveforms onto downlink W-CDMA slots and OFDM waveforms onto E-MBMS slots.

Each outer-frame contains M time slots that may be used for W-CDMA and OFDM, as shown in FIG. 3. Zero, one, or multiple time slots (e.g., the first time slot in each frame) may be reserved for W-CDMA. The unreserved time slots may be allocated to W-CDMA and OFDM in various manners and based on various factors such as system loading, usage requirements, and so on.

Figure 6A:
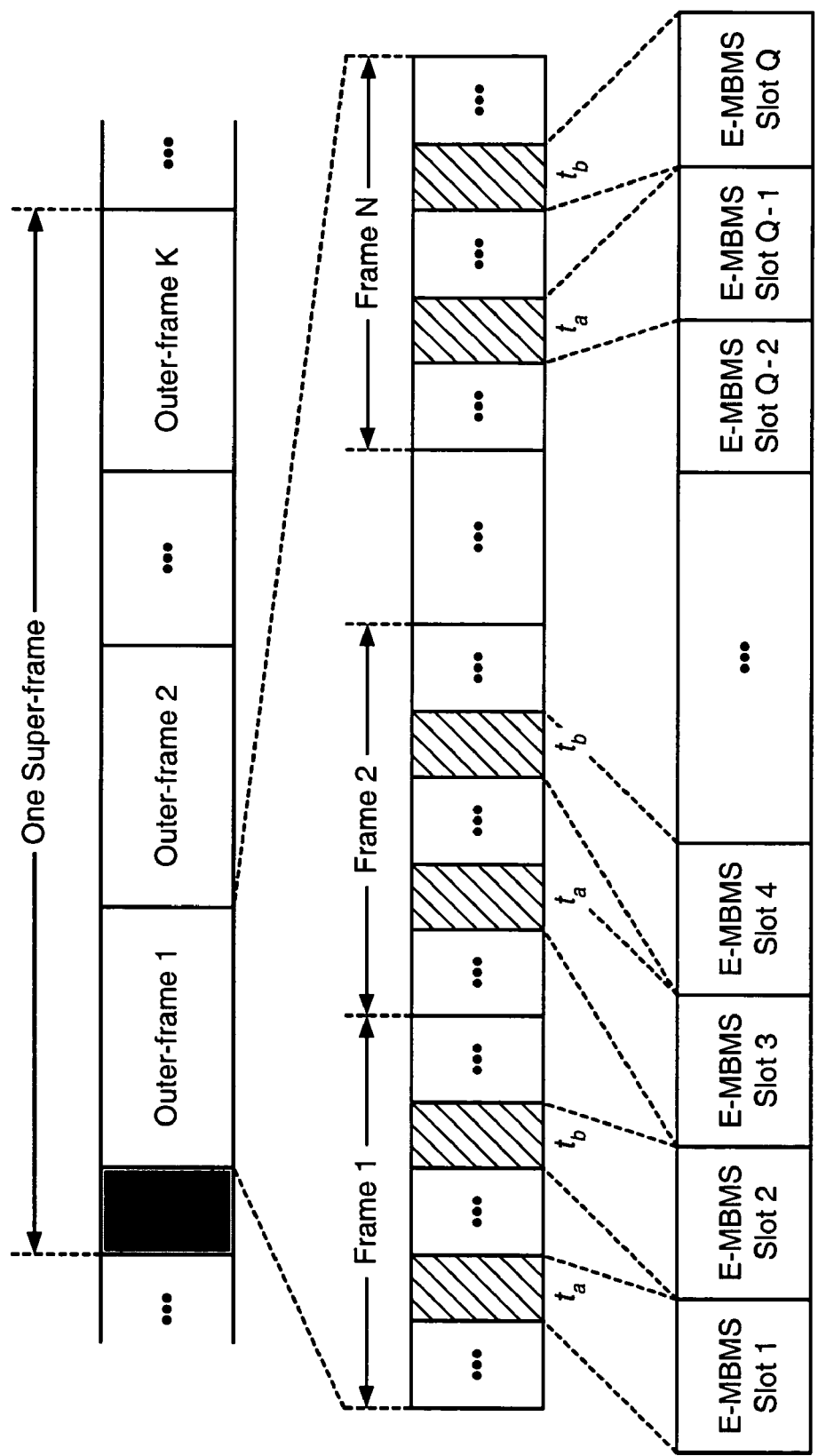
FIGS. 6A and 6B show two embodiments for selecting time slots used for OFDM.

FIG. 6A shows a first embodiment for allocating time slots in a super-frame for E-MBMS. For this embodiment, the N frames in each outer-frame of a super-frame contains the same set of E-MBMS slots, i.e., the same number of E-MBMS slots that are located at the same slot indices within each frame. For the example shown in FIG. 6A, time slots $t_a$ and $t_b$ in each frame are E-MBMS slots. The number of E-MBMS slots in each outer-frame (Q) is equal to the number of E-MBMS slots per frame (G) times the number of frames per outer-frame (N), or Q=G×N.

Figure 6B:
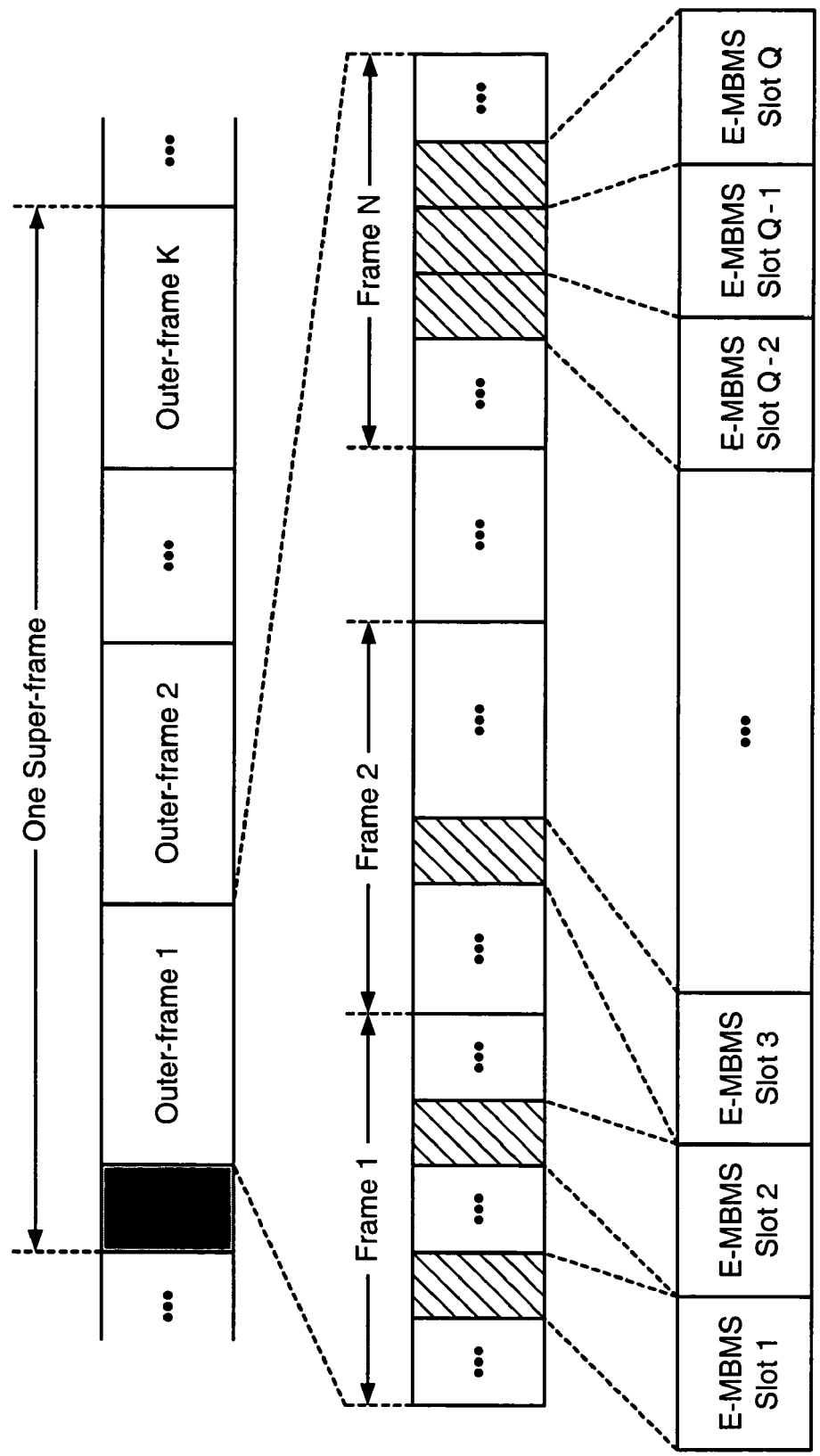

FIG. 6B shows a second embodiment for allocating time slots in a super-frame for E-MBMS. For this embodiment, each time slot that is not reserved for W-CDMA may be used as an E-MBMS slot. This embodiment provides complete flexibility in allocating time slots for E-MBMS. For the example shown in FIG. 6B, two time slots in frame 1 of outer-frame 1 are allocated for E-MBMS, one time slot in frame 2 is allocated for E-MBMS, and so on, and three time slots in frame N are allocated for E-MBMS.

For the embodiments shown in FIGS. 6A and 6B, the time slots allocated for E-MBMS may be assigned sequential indices 1 through Q, where Q is the number of E-MBMS slots in one outer-frame and Q≦V. E-MBMS physical channels may be sent on the Q E-MBMS slots.

A given E-MBMS physical channel may or may not be transmitted in a given super-frame. In an embodiment, an E-MBMS physical channel that is transmitted in a given super-frame is allocated one or more time slots in one or more frames of each outer-frame in the super-frame. Furthermore, the E-MBMS physical channel has the same slot and frame allocation for all K outer-frames of the super-frame. For example, the E-MBMS physical channel may be allocated time slot t in frame n of each outer-frame in the super-frame. In this example, the E-MBMS physical channel is allocated a total of K time slots that are evenly spaced apart by M time slots. An E-MBMS physical channel may also be allocated multiple time slots in each outer-frame, and these time slots may be adjacent to one another or distributed across the outer-frame.

An E-MBMS physical channel may be transmitted using a transport block (TB) format selected from among a set of TB formats supported by the system. The TB formats may also be referred to as modes, rates, transport block sizes, and so on. Each TB format may indicate various parameters for transmitting an E-MBMS physical channel in a super-frame. For example, each TB format may indicate a specific data rate, a specific inner code rate, a specific modulation scheme, a specific transport block size, a specific number of code blocks, and so on. The inner code may be a Turbo code, a convolutional code, or some other code. An E-MBMS physical channel may further be encoded with an outer code, which may be a block code such as a Reed-Solomon code.

Table 2 shows an exemplary set of TB formats for frame design 3 in Table 1. Table 2 assumes that an E-MBMS physical channel is allocated one time slot in each of the four outer-frames (or a total of four time slots) in a super-frame. One transport block is sent on the E-MBMS physical channel in the super-frame. The transport block is optionally encoded with an (n, k) Reed-Solomon code, then appended with a 16-bit CRC value, and then partitioned into one or two code blocks. Each code block is encoded with an inner code, interleaved, and mapped to modulation symbols. The inner code rates in Table 2 assume that 2331 modulation symbols can be sent in each E-MBMS slot, e.g., 777 modulation symbols/OFDM symbol×three OFDM symbols/E-MBMS slot.

TABLE 2

| Transport Block Format | Data Rate (kbps) | Transport Block Size (bits) | Reed-Solomon Code Rate (n, k) | Number of Code Blocks | Code Block Size (w/CRC) | Inner Code Rate | Modulation Scheme |
|---|---|---|---|---|---|---|---|
| 1 | 4 | 1000 | — | 1 | 1016 | 0.2179 | QPSK |
|   |   |      | (16, 14) | 1 | 1160 | 0.2488 | QPSK |
|   |   |      | (16, 12) | 1 | 1352 | 0.2900 | QPSK |
| 2 | 8 | 2000 | — | 1 | 2016 | 0.4324 | QPSK |
|   |   |      | (16, 14) | 1 | 2304 | 0.4942 | QPSK |
|   |   |      | (16, 12) | 1 | 2688 | 0.2883 | 16-QAM |
| 3 | 12 | 3000 | — | 1 | 3016 | 0.3235 | 16-QAM |
|   |   |      | (16, 14) | 1 | 3456 | 0.3707 | 16-QAM |
|   |   |      | (16, 12) | 1 | 4016 | 0.4307 | 16-QAM |
| 4 | 16 | 4000 | — | 1 | 4016 | 0.4307 | 16-QAM |
|   |   |      | (16, 14) | 1 | 4592 | 0.4925 | 16-QAM |
|   |   |      | (16, 12) | 2 | 2676 | 0.3827 | 64-QAM |
| 5 | 20 | 5000 | — | 1 | 5016 | 0.3586 | 64-QAM |
|   |   |      | (16, 14) | 2 | 2868 | 0.4101 | 64-QAM |
|   |   |      | (16, 12) | 2 | 3344 | 0.4782 | 64-QAM |
| 6 | 24 | 6000 | — | 2 | 3008 | 0.4301 | 64-QAM |
|   |   |      | (16, 14) | 2 | 3440 | 0.4919 | 64-QAM |
|   |   |      | (16, 12) | 2 | 4008 | 0.5731 | 64-QAM |

Table 2 shows some exemplary TB formats. In general, any number of TB formats may be defined, and a TB format may be associated with any set of parameters.

The TB formats used for the E-MBMS physical channels may be sent in various manners. In an embodiment, the TB formats are sent on a separate control channel. An example is a High Speed Shared Control Channel (HS-SCCH) that carries the transport block formats for a High Speed Downlink Packet Access (HSDPA) channel in W-CDMA. This embodiment may be used if the TB formats are fixed or changed at a slow rate. In another embodiment, the TB formats are sent inband along with traffic data on the E-MBMS physical channels. As an example, a transport format (TF) is explicitly signaled in a transport format combination indicator (TFCI) field of a Secondary Common Control Physical Channel (S-CCPCH) that carries an MBMS point-to-multipoint Traffic Channel (MTCH) for MBMS in W-CDMA. In yet another embodiment, which is described in detail below, the TB formats are sent in an MBMS point-to-multipoint Control Channel (MCCH) that is sent in the header field of each super-frame. The MCCH may also be called an overhead information symbol (OIS) or by some other terminology.

The MCCH may be sent at the start of each super-frame and may convey pertinent information used to receive all E-MBMS physical channels sent in that super-frame. The MCCH may carry various types of information depending on the manner in which the streams and E-MBMS physical channels are transmitted. In an embodiment, the MCCH carries the following overhead information for each E-MBMS physical channel being sent in the super-frame:

1. the stream being carried by the E-MBMS physical channel;
2. the time slot assigned to the E-MBMS physical channel;
3. the TB format used for the E-MBMS physical channel; and
4. the outer code rate used for the E-MBMS physical channel.

In an embodiment, each stream is mapped to and sent on one E-MBMS physical channel. Hence, there is a one-to-one mapping between streams and E-MBMS physical channels so that stream x is sent on E-MBMS physical channel x. For this embodiment, the overhead information does not need to convey item 1 above since the same identifier is used for both the stream and the E-MBMS physical channel that carries that stream. The terms "stream" and "E-MBMS physical channel" may then be used interchangeably. Each stream may be assigned one or more time slots in one or more frames of each outer-frame. Items 2, 3 and 4 may be conveyed in various manners.

FIG. 7A shows an embodiment of an E-MBMS Parameters Message 710 used to carry overhead information for the streams sent in a super-frame. Message 710 includes Q E-MBMS slot records, one record for each E-MBMS slot in the super-frame, followed by a CRC field. Each E-MBMS slot record contains a stream identifier (ID) field, a TB format field, and an outer code rate field. For each record, the stream ID field conveys the identifier of the stream being sent in the E-MBMS slot associated with that record, the TB format field conveys the TB format used for the stream, and the outer code rate field conveys the Reed-Solomon code rate used for the stream. The CRC field carries a CRC value that is generated based on the Q E-MBMS slot records in the message. A terminal may use the CRC value to determine whether the message is decoded correctly.

If each stream is sent on at least one E-MBMS slot in each outer-frame, then the maximum number of streams is determined by the maximum number of E-MBMS slots in one outer-frame. The number of bits (B) needed to convey the stream being sent on a given E-MBMS slot is $B=\lceil \log_2 V \rceil$, where $\lceil y \rceil$ denotes a ceiling operator that provides an integer value that is equal to or greater than y. As an example, for frame design 2 shown in Table 1, each outer-frame may contain up to 403 E-MBMS slots, which may be used to send up to 403 streams. Each stream may be identified by a 9-bit value.

The TB format indicates all of the parameters shown in Table 2 except for the outer code rate. The number of bits used to convey the TB format is dependent on the number of TB formats supported by the system. The number of bits used to convey the outer code rate is dependent on the number of outer code rates supported by the system.

Table 3 shows two exemplary designs for an E-MBMS slot record. A 9-bit stream ID field supports up to 512 streams and may be used for all three frame designs shown in Table 1. An 8-bit TB format field supports up to 256 TB formats. For record design 1, a 4-bit outer code rate field supports up to 16 outer code rates. For example, the system may support Reed-Solomon code rates of (16, k), where k is less than or equal to 16 and may be sent with four bits. For record design 2, the Reed-Solomon code rate may be (1) fixed (e.g., to code rate (16, 12)) and does not need to be sent, or (2) sent via some other channel, or (3) embedded within the TB format. The CRC field carries a 16-bit CRC value.

TABLE 3

| Fields | Record Design 1 | Record Design 2 | |
|---|---|---|---|
| Stream ID | 9 | 9 | bits |
| TB format | 8 | 8 | bits |
| Outer code rate | 4 | 0 | bits |
| Number of bits/record | 21 | 17 | |
| CRC for message | 16 | 16 | bits |

Table 3 shows specific embodiments of an E-MBMS slot record with specific fields. The E-MBMS slot record may include fewer, different, or additional fields, and this is within the scope of the invention.

Table 4 shows processing and transmission parameters for E-MBMS Parameters Message 710 for different numbers of E-MBMS slot records. For frame design 2 in Table 1, 31 E-MBMS slots are available in each outer-frame if one time slot is used for E-MBMS in each frame of the outer-frame, 62 E-MBMS slots are available if two time slots are used for E-MBMS in each frame, and so on, and 403 E-MBMS slots are available if 13 time slots are used for E-MBMS in each frame. The number of E-MBMS slot records is equal to the number of E-MBMS slots. The number of bits for E-MBMS Parameters Message 710 is equal to the number of records (Q) times the number of bits per record (17 to 21), plus 16 bits for the CRC.

In an embodiment, E-MBMS Parameters Message 710 is Turbo encoded at the code rate given in Table 4 and then mapped to QPSK modulation symbols. In general, the code rate and modulation scheme for the message are selected to achieve reliable reception of the message at the edge of coverage. The message may be sent in one or more time slots used for the MCCH, which are called MCCH slots. The number of MCCH slots is determined by the message size. For the record designs shown in Table 4, the number of MCCH slots is equal to the number of E-MBMS slots in each frame.

TABLE 4

| Parameters | Record Design 1 | | | | | Record Design 2 | | | | |
|---|---|---|---|---|---|---|---|---|---|---|
| Num bits/record | 21 | | | | | 17 | | | | |
| Num E-MBMS slot records (Q) | 31 | 62 | 124 | 248 | 403 | 31 | 62 | 124 | 248 | 403 |
| Num bits/message | 667 | 1318 | 2620 | 5224 | 8479 | 543 | 1070 | 2124 | 4232 | 6867 |
| Code Type | Turbo | | | | | Turbo | | | | |
| Modulation | QPSK | | | | | QPSK | | | | |
| Num MCCH slots | 1 | 2 | 4 | 8 | 13 | 1 | 2 | 4 | 8 | 13 |
| Code Rate | 0.145 | 0.142 | 0.141 | 0.140 | 0.140 | 0.118 | 0.116 | 0.114 | 0.114 | 0.113 |

E-MBMS Parameters Message 710 carries Q E-MBMS slot records for Q E-MBMS slots in each outer-frame of a super-frame. The records in the message are mapped in sequential order to the E-MBMS slots in the first outer-frame, so that the q-th record is for the q-th E-MBMS slot.

The specific time slots to use as E-MBMS slots may be selected in various manners, e.g., as shown in FIG. 6A or 6B. Information that indicates which time slots are E-MBMS slots, which is called allocation information, may be given in various formats. For the first embodiment shown in FIG. 6A, each frame in the super-frame contains the same set of E-MBMS slots. Hence, all E-MBMS slots in the super-frame may be conveyed by sending information that identifies the E-MBMS slots for one frame. For example, a 13-bit field may be defined for the 13 time slots that may be used for E-MBMS in each frame, one bit for each time slot. Each bit in this 13-bit field may be set to '1'0 if the corresponding time slot is an E-MBMS slot or to '0' otherwise. For the second embodiment shown in FIG. 6B, each time slot in an outer-frame may be used for W-CDMA or OFDM. All E-MBMS slots in the in the super-frame may be conveyed by sending information that identifies the E-MBMS slots for one outer-frame. For example, a 403-bit field may be defined for the 403 time slots that may be used for E-MBMS with frame design 2, one bit for each time slot. Each bit may be set to '1' if the corresponding time slot is an E-MBMS slot or to '0' otherwise.

The allocation information may be sent in various manners. In an embodiment, the allocation information is sent separately from the overhead information, e.g., in a broadcast channel (BCH). This embodiment may be used if the E-MBMS slots are static or semi-static and the allocation information may be sent infrequently. In another embodiment, the allocation information is sent as part of E-MBMS Parameters Message 710. For example, the 13-bit field or 403-bit field may be appended prior to E-MBMS slot 1 record. This embodiment may be used if the E-MBMS slots are semi-static or dynamic and/or if the allocation information includes a small number of bits.

FIG. 7B shows an embodiment of an E-MBMS Parameters Message 720 used to carry overhead information for the streams sent in a super-frame. Message 720 includes M time slot records, one record for each time slot in an outer-frame, followed by a CRC field. Each time slot record contains an E-MBMS field (denoted as "E" in FIG. 7B), a stream ID field, a TB format field, and an outer code rate field. For each record, the E-MBMS field is set to '1' if the corresponding time slot is an E-MBMS slot and to '0' otherwise. If the E-MBMS field is set to '1', then the stream ID field conveys the identifier of the stream being sent in the time slot, the TB format field conveys the TB format used for the stream, and the outer code rate field conveys the Reed-Solomon code rate used for the stream. If the E-MBMS field is set to '0', then no other fields are sent in the record for the time slot. The CRC field carries a CRC value that is generated based on the M time slot records in the message. E-MBMS Parameters Message 720 carries the information indicating which time slots are E-MBMS slots.

Figure 7C:
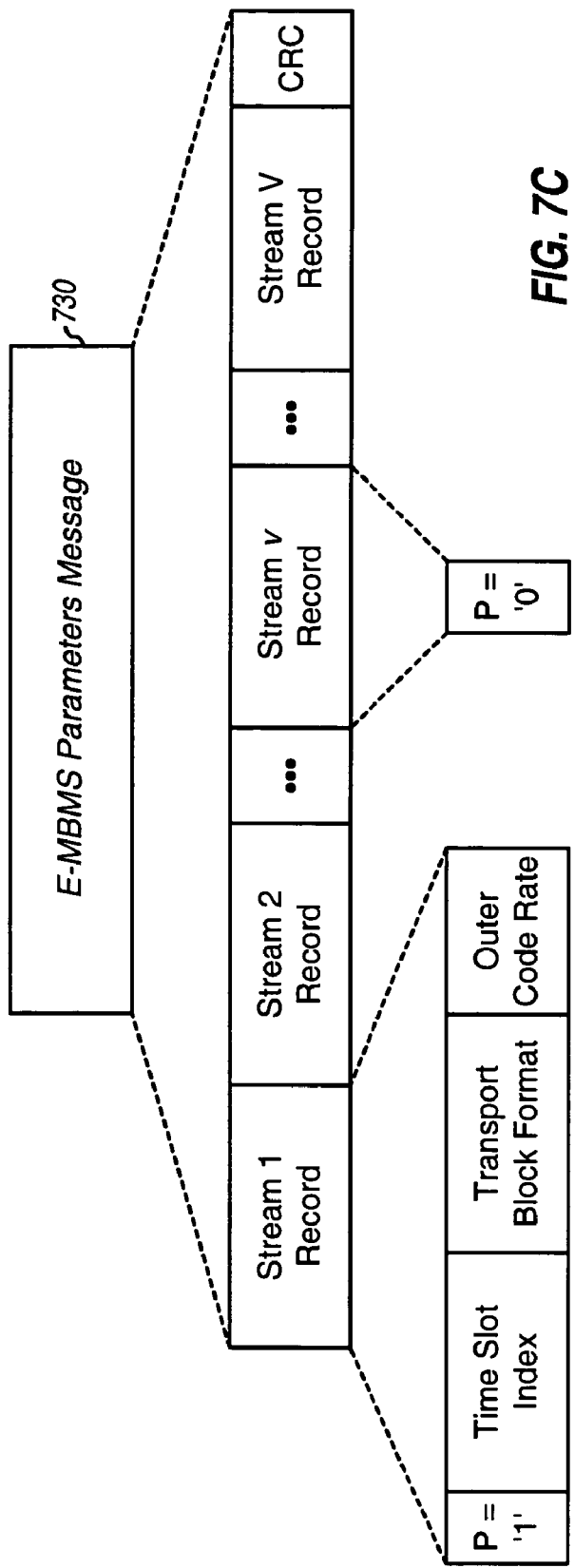

FIG. 7C shows an embodiment of an E-MBMS Parameters Message 730 used to carry overhead information for the streams sent in a super-frame. Message 730 includes V stream records, one record for each stream, followed by a CRC field. Each stream record contains a present field (denoted as "P" in FIG. 7C), a time slot index field, a TB format field, and an outer code rate field. For each record, the present field is set to '1' if the stream corresponding to that record is being sent in the super-frame and to '0' otherwise. If the present field is set to '1', then the time slot index field conveys the index of the time slot in which the stream is sent, the TB format field conveys the TB format used for the stream, and the outer code rate field conveys the Reed-Solomon code rate used for the stream. If the present field is set to '0', then no other fields are sent in the record for the stream. The CRC field carries a CRC value that is generated based on the V stream records in the message. For E-MBMS Parameters Message 730, no additional information is needed to convey which time slots are E-MBMS slots.

FIGS. 7A through 7C show several embodiments for sending overhead information for the streams. The overhead information may also be sent in other manners, and this is within the scope of the invention.

Figure 8:
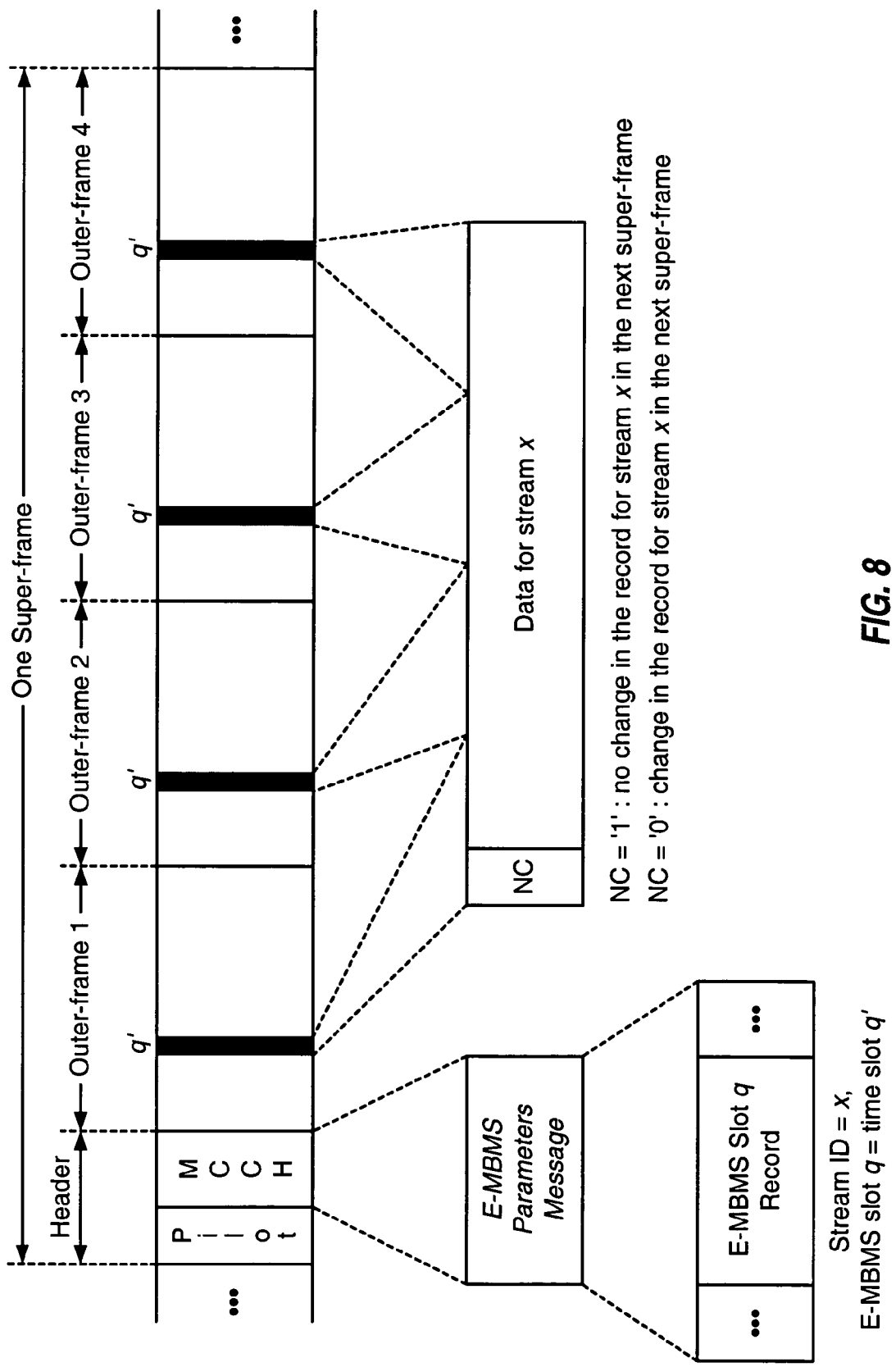
FIG. 8 shows a transmission for one stream in the 4-tier frame structure.

FIG. 8 shows an exemplary transmission for one stream x with the 4-tier frame structure shown in FIG. 3. In this example, stream x is transmitted in four bursts on the time slots allocated to stream x in super-frame m. These four bursts are transmitted at the same location in the four outer-frames of the super-frame, one burst per outer-frame. Each burst may span one or multiple time slots. Although not shown in FIG. 8, stream x may be allocated different time slots and frames in the next super-frame m+1.

FIG. 8 also shows transmission of the TDM pilot and the MCCH in the header field at the start of the super-frame. The TDM pilot may be transmitted in one or more time slots and may be used for synchronization and possibly channel estimation. The MCCH may be sent in one or more time slots and may carry E-MBMS Parameters Message 710 (as shown in FIG. 8) or some other message that carries overhead information. The TDM pilot and MCCH may also be sent in other manners different from the manner shown in FIG. 8.

A terminal interested in receiving stream x would decode the E-MBMS Parameters Message sent in the MCCH and then scan through the records in the decoded message to look for a record pertaining to stream x. This record would indicate the time slots in which stream x will be sent in the current super-frame, which in this example is time slot q' in each outer-frame. The terminal would then process time slot q' in each outer-frame to recover a MAC capsule sent for stream x. In an embodiment, the MAC capsule includes a no change (NC) field and a data field. The data field carries a transport block for stream x. The no change field may be set to '1' to indicate no change in the overhead information record for stream x in the next super-frame or to '0' otherwise. The terminal does not need to process the MCCH in the next super-frame if the no change field is set to '1'.

Figure 9:
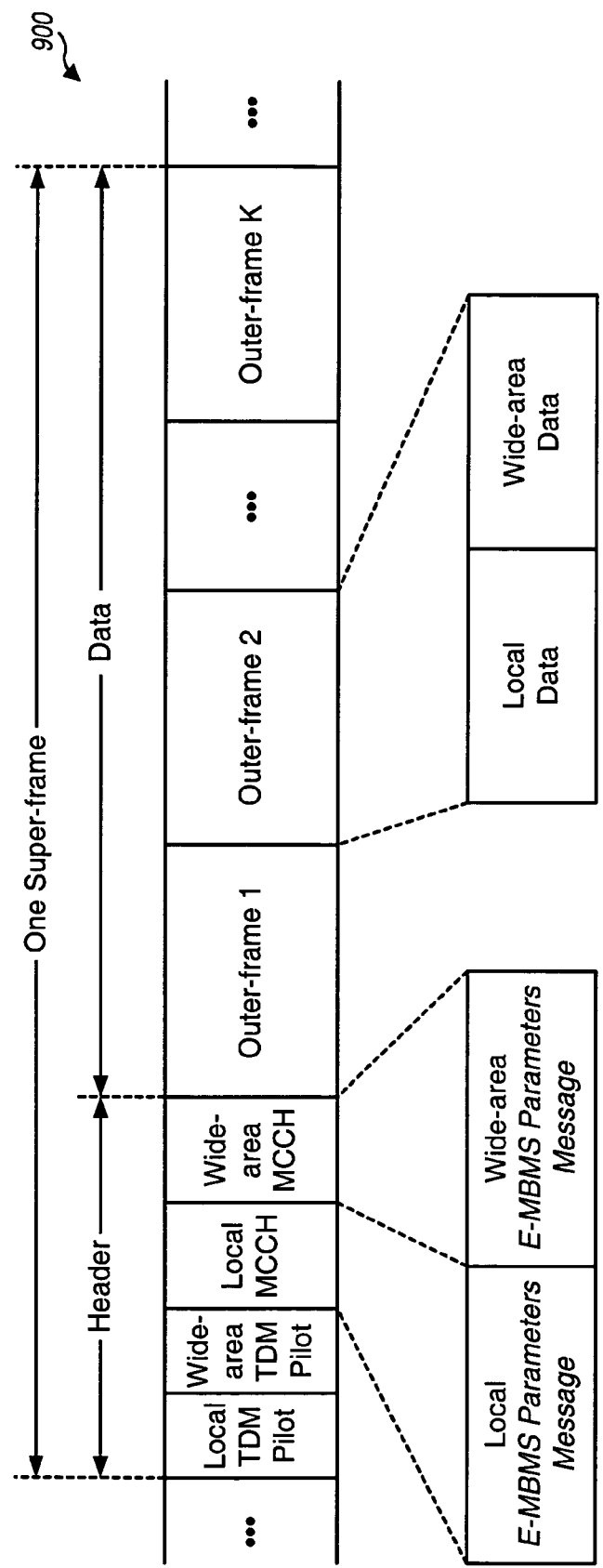
FIG. 9 shows a super-frame structure for sending local and wide-area data.

FIG. 9 shows an embodiment of a super-frame structure 900 for sending local data and wide-area data. The E-MBMS physical channels may carry local data and wide-area data. It is desirable for all base stations in a given local area to send the same local transmissions in the same time slots so that a terminal can collect all of the power for these transmissions. Similarly, it is desirable for all base stations in a given wide area to send the same wide-area transmissions in the same time slots. Each outer-frame of the super-frame may thus be partitioned into (1) a local segment used to send local data and (2) a wide-area segment used to send wide-area data. A local MCCH may convey overhead information for streams carrying local data, and a wide-area MCCH may convey overhead information for streams carrying wide-area data. A local TDM pilot and a wide-area TDM pilot may also be transmitted at the start of the super-frame to facilitate synchronization and channel estimation for local and wide-area transmissions, respectively.

Figure 10:
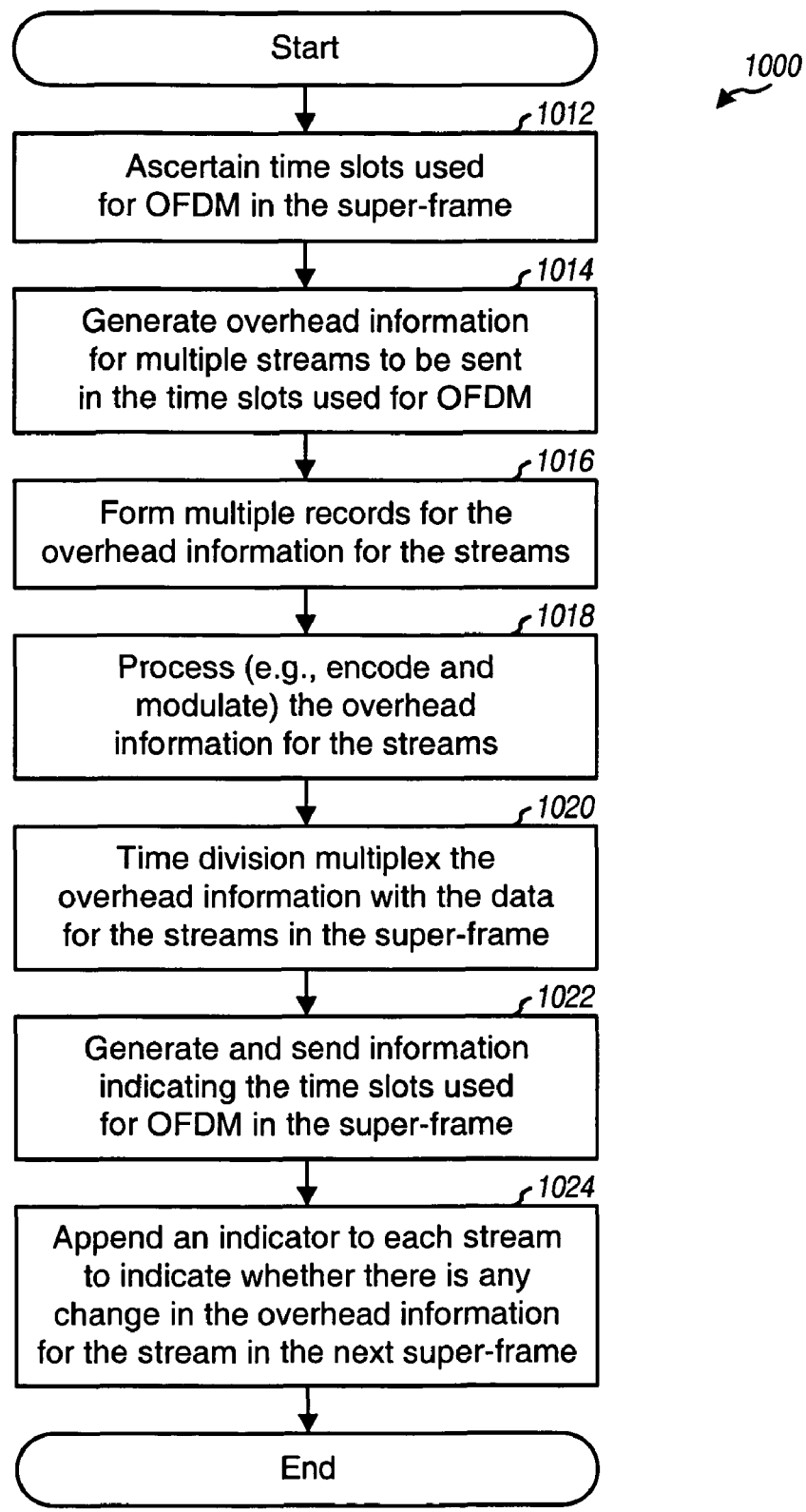
FIG. 10 shows a process for transmitting overhead information.

FIG. 10 shows a process 1000 for transmitting overhead information for broadcast and multicast services. Process 1000 may be performed in each super-frame.

Initially, time slots used for OFDM in the super-frame are ascertained (block 1012). The time slots in the super-frame may be allocated for OFDM based on a structure, e.g., as shown in FIG. 6A, or each time slot may be individually allocated for either OFDM or W-CDMA. Overhead information for multiple streams to be sent in the time slots used for OFDM is generated (block 1014). The overhead information conveys the time slots and the coding and modulation used for the streams and may be given in various forms. For example, the overhead information for each stream may indicate the time slots allocated to the stream in the super-frame, the inner code rate, outer code rate, modulation scheme, and transport block size used for the stream, and so on. Multiple records may be formed for the overhead information for the streams (block 1016). For example, one record may be formed for each OFDM slot as shown in FIG. 7A, for each time slot as shown in FIG. 7B, for each stream as shown in FIG. 7C, and so on. The overhead information for the streams is processed, e.g., encoded and modulated, (block 1018) and then time division multiplexed with the data for the streams in the super-frame (block 1020). Information indicating the time slots used for OFDM in the super-frame may be sent separately or included in the overhead information (block 1022). An indicator may also be appended to each stream to indicate whether there is any change in the overhead information for the stream in the next super-frame (block 1024).

Figure 11:
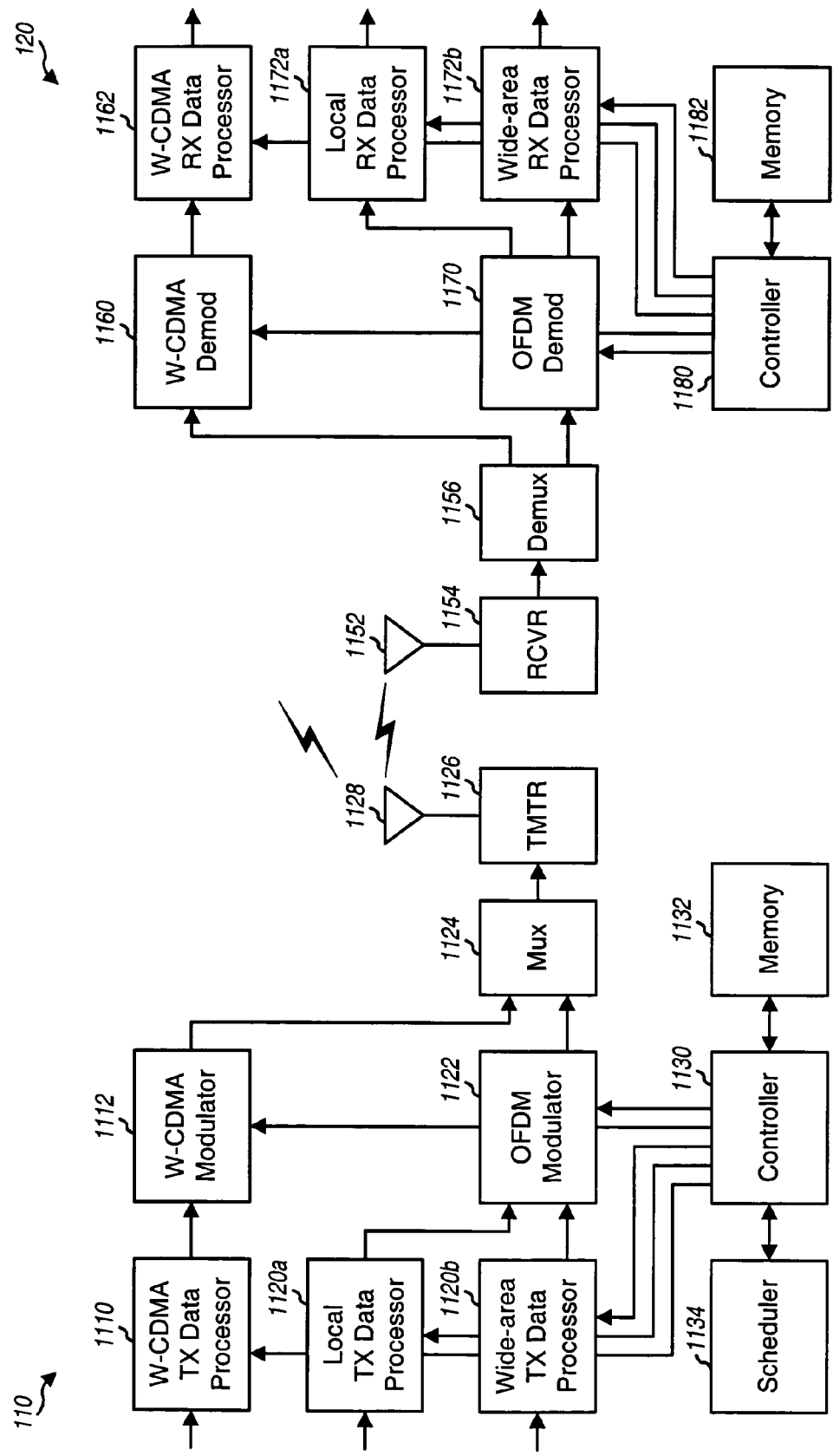
FIG. 11 shows a block diagram of a base station and a terminal.

FIG. 11 shows a block diagram of a base station 110 and a terminal 120. At base station 110, a W-CDMA transmit (TX) data processor 1110 receives and processes data to be transmitted with W-CDMA and generates coded data for W-CDMA. A W-CDMA modulator 1112 processes the W-CDMA coded data and generates a W-CDMA waveform for each W-CDMA slot. The processing by W-CDMA modulator 1112 includes (1) mapping the coded data for each W-CDMA physical channel to modulation symbols, (2) channelizing the modulation symbols for each physical channel with an orthogonal sequence, (3) scrambling the channelized symbols for each physical channel with a scrambling code, and (4) scaling and summing the scrambled data for all physical channels. A local TX data processor 1120a receives and processes local data to be sent using OFDM and generates data and pilot symbols for local transmissions. A wide-area TX data processor 1120b receives and processes wide-area data to be sent using OFDM and generates data and pilot symbols for wide-area transmissions. Local and/or wide-area TX data processor 1120 also processes overhead information (e.g., E-MBMS Parameters Message) for the MCCH. An OFDM modulator 1122 performs OFDM modulation on the data and pilot symbols, generates OFDM symbols, and forms an OFDM waveform for each E-MBMS slot. A multiplexer (Mux) 1124 multiplexes W-CDMA waveforms onto downlink W-CDMA slots, multiplexes OFDM waveforms onto E-MBMS slots, and provides an output signal. A transmitter unit (TMTR) 1126 conditions (e.g., converts to analog, filters, amplifies, and frequency upconverts) the output signal and generates a modulated signal that is transmitted from an antenna 1128.

At terminal 120, an antenna 1152 receives the modulated signal transmitted by base station 110 and provides a received signal to a receiver unit (RCVR) 1154. Receiver unit 1154 conditions, digitizes, and processes the received signal and provides a stream of samples to a demultiplexer (Demux) 1156. Demultiplexer 1156 provides samples in downlink W-CDMA slots to a W-CDMA demodulator (Demod) 1160 and samples in E-MBMS slots to an OFDM demodulator 1170. W-CDMA demodulator 1160 processes the received samples in a manner complementary to the processing by W-CDMA modulator 1112 and provides symbol estimates. A W-CDMA receive (RX) data processor 1162 processes (e.g., demodulates, deinterleaves, and decodes) the symbol estimates and provides decoded data for W-CDMA. OFDM demodulator 1170 performs OFDM demodulation on the received samples and provides data symbol estimates. A local RX data processor 1172a processes the data symbol estimates for local transmissions and provides decoded local data. A wide-area RX data processor 1172b processes the data symbol estimates for wide-area transmissions and provides decoded wide-area data. In general, the processing at terminal 120 is complementary to the processing at base station 110.

Controllers 1130 and 1180 direct the operation at base station 110 and terminal 120, respectively. Memory units 1132 and 1182 store program codes and data used by controllers 1130 and 1180, respectively. Controller 1130 and/or a scheduler 1134 allocates time slots for the downlink and uplink, allocates downlink slots for W-CDMA and OFDM, and allocates E-MBMS slots to streams.

The techniques described herein for transmitting overhead information may be implemented by various means. For example, these techniques may be implemented in hardware, software, or a combination thereof. For a hardware implementation, the processing units used to generate, process, and transmit overhead information at a base station may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, electronic devices, other electronic units designed to perform the functions described herein, or a combination thereof. The processing units used to receive and use overhead information at a terminal may also be implemented within one or more ASICs, DSPs, processors, and so on.

For a software implementation, the techniques may be implemented with modules (e.g., procedures, functions, and so on) that perform the functions described herein. The software codes may be stored in a memory unit (e.g., memory unit 1132 or 1182 in FIG. 11) and executed by a processor (e.g., controller 1130 or 1180). The memory unit may be implemented within the processor or external to the processor, in which case it can be communicatively coupled to the processor via various means as is known in the art.

The previous description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the principles and novel features disclosed herein.

What is claimed is:

1. An apparatus comprising:
controller to ascertain time slots used for a first radio technology among at least two radio technologies utilized by a wireless communication system, to generate overhead information for a plurality of streams to be sent in the time slots used for the first radio technology, and to append an indicator to each stream of the plurality of streams, wherein a control channel carries the overhead information, wherein the indicator is not included in the overhead information that is carried via the control channel, wherein the indicator for a particular stream is sent in a time slot that includes data for that stream, wherein the indicator for a particular stream indicates whether there is any change in the overhead information for the stream in an upcoming time interval, and wherein the overhead information for a particular stream indicates at least one time slot allocated to the stream, a transport block format that is used for the stream, and an outer code rate used for the stream; and
a processor to process the overhead information for the plurality of streams for transmission;
wherein the first radio technology is Orthogonal Frequency Division Multiplexing (OFDM), and wherein the at least two radio technologies comprise OFDM and Wideband Code Division Multiple Access (W-CDMA).

2. The apparatus of claim 1, wherein the overhead information for each stream further indicates coding and modulation used for the stream.

3. The apparatus of claim 1, wherein the controller forms a plurality of records for the overhead information for the plurality of streams, and wherein at least one of said plurality of records contains a stream identifier field, a transport block format field, and an outer code rate field.

4. The apparatus of claim 1, wherein the controller further generates information indicating the time slots used for the first radio technology.

5. The method of claim 1, wherein the indicator for a particular stream indicates whether there is any change in the overhead information for the stream in the next superframe, and wherein the indicator for a particular stream and the data for that stream are included in the same medium access control capsule.

6. A method of transmitting overhead information in a wireless communication system, comprising:
    ascertaining, by a wireless communication apparatus, time slots used for a first radio technology among at least two radio technologies utilized by the wireless communication system;
    determining, by the wireless communication apparatus, overhead information for a plurality of streams to be sent in the time slots used for the first radio technology, wherein the overhead information for a particular stream indicates at least one time slot allocated to the stream, a transport block format that is used for the stream, and an outer code rate used for the stream;
    processing, by the wireless communication apparatus, the overhead information for the plurality of streams for transmission; and
    appending, by the wireless communication apparatus, an indicator to each stream of the plurality of streams;
    wherein a control channel carries the overhead information, wherein the indicator is not included in the overhead information that is carried via the control channel, wherein the indicator for a particular stream is sent in a time slot that includes data for that stream, and wherein the indicator for a particular stream indicates whether there is any change in the overhead information for the stream in an upcoming time interval; and
    wherein the first radio technology is Orthogonal Frequency Division Multiplexing (OFDM), and wherein the at least two radio technologies comprise OFDM and Wideband Code Division Multiple Access (W-CDMA).

7. The method of claim 6, further comprising: forming a plurality of records for the overhead information for the plurality of streams, and wherein at least one of said plurality of records contains a stream identifier field, a transport block format field, and an outer code rate field.

8. An apparatus comprising:
    means for ascertaining time slots used for a first radio technology among at least two radio technologies utilized by a wireless communication system;
    means for determining overhead information for a plurality of streams to be sent in the time slots used for the first radio technology, wherein the overhead information for a particular stream indicates at least one time slot allocated to the stream, a transport block format that is used for the stream, and an outer code rate used for the stream;
    means for processing the overhead information for the plurality of streams for transmission, and
    means for appending an indicator to each stream of the plurality of streams;
    wherein a control channel carries the overhead information, wherein the indicator is not included in the overhead information that is carried via the control channel, wherein the indicator for a particular stream is sent in a time slot that includes data for that stream, and wherein the indicator for a particular stream indicates whether there is any change in the overhead information for the stream in an upcoming time interval;
    wherein the first radio technology is Orthogonal Frequency Division Multiplexing (OFDM), and wherein the at least two radio technologies comprise OFDM and Wideband Code Division Multiple Access (W-CDMA).

9. The apparatus of claim 8, further comprising:
    means for forming a plurality of records for the overhead information for the plurality of streams, and wherein at least one of said plurality of records contains a stream identifier field, a transport block format field, and an outer code rate field.

10. An apparatus comprising:
    a controller to ascertain time slots used for Orthogonal Frequency Division Multiplexing (OFDM) in a super-frame comprised of a plurality of time slots, to determine overhead information for a plurality of streams to be sent in the time slots used for OFDM, and to append an indicator to each stream of the plurality of streams, wherein a control channel carries the overhead information, wherein the indicator is not included in the overhead information that is carried via the control channel, wherein the indicator for a particular stream is sent in a time slot that includes data for that stream, wherein the indicator for a particular stream indicates whether there is any change in the overhead information for the stream in an upcoming time interval, wherein remaining time slots in the super-frame are used for Wideband Code Division Multiple Access (W-CDMA), and wherein the overhead information for a particular stream indicates at least one time slot allocated to the stream in the super-frame, a transport block format that is used for the stream, and an outer code rate used for the stream; and
    a processor to process the overhead information for the plurality of streams and to time division multiplex the processed overhead information with data for the plurality of streams in the super-frame.

11. The apparatus of claim 10, wherein the overhead information for each stream further indicates an inner code rate, an outer code rate, and a modulation scheme used for the stream, or a combination thereof.

12. The apparatus of claim 10, wherein the overhead information for each stream further indicates a transport block size for the stream, or the number of code blocks to be sent in the super-frame for the stream, or both.

13. The apparatus of claim 10, wherein the controller forms a plurality of records for the time slots used for OFDM, and wherein each record covers at least one time slot used for the OFDM and carries overhead information for a stream sent on the at least one time slot, and wherein at least one of said plurality of records contains a stream identifier field, a transport block format field, and an outer code rate field.

14. The apparatus of claim 10, wherein the controller forms a plurality of records for the plurality of time slots in the super-frame, one record for each set of at least one time slot among the plurality of time slots in the super-frame, and wherein each record indicates whether or not the corresponding set of at least one time slot is used for OFDM and, if used for OFDM, further carries overhead information for a stream sent in the set of at least one time slot, and wherein at least one of said plurality of records contains a stream identifier field, a transport block format field, and an outer code rate field.

15. The apparatus of claim 10, wherein the controller forms a plurality of records for the plurality of streams, and wherein each record carries overhead information for one of the plurality of streams, and wherein at least one of said plurality of records contains a stream identifier field, a transport block format field, and an outer code rate field.

16. The apparatus of claim 10, wherein the super-frame comprises a plurality of outer-frames, each outer-frame comprises a plurality of frames, and each frame comprises at least two time slots.

17. The apparatus of claim 16, wherein the controller allocates a set of at least one time slot in each outer-frame of the super-frame to each stream.

18. The apparatus of claim 16, wherein the controller allocates a set of time slots in each frame for OFDM, and wherein the same set of time slots is allocated for OFDM for the plurality of frames of each outer-frame.

19. The apparatus of claim 10, wherein the controller further generates information indicating the time slots used for OFDM in the super-frame.

20. A method of transmitting overhead information in a wireless communication system, comprising:
  ascertaining, by a wireless communication apparatus, time slots used for Orthogonal Frequency Division Multiplexing (OFDM) in a super-frame comprised of a plurality of time slots, wherein remaining time slots in the super-frame are used for Wideband Code Division Multiple Access (W-CDMA);
  determining, by the wireless communication apparatus, overhead information for a plurality of streams to be sent in the time slots used for OFDM, wherein the overhead information for a particular stream indicates at least one time slot allocated to the stream in the super-frame, a transport block format that is used for the stream, and an outer code rate used for the stream;
  time division multiplexing, by the wireless communication apparatus, the overhead information for the plurality of streams with data for the plurality of streams in the super-frame, and
  appending, by the wireless communication apparatus, an indicator to each stream of the plurality of streams;
  wherein a control channel carries the overhead information, wherein the indicator is not included in the overhead information that is carried via the control channel, wherein the indicator for a particular stream is sent in a time slot that includes data for that stream, and wherein the indicator for a particular stream indicates whether there is any change in the overhead information for the stream in an upcoming time interval.

21. The method of claim 20, further comprising: forming a plurality of records for the time slots used for OFDM, wherein each record covers at least one time slot used for the OFDM and carries overhead information for a stream sent on the at least one time slot.

22. An apparatus comprising:
  means for ascertaining time slots used for Orthogonal Frequency Division Multiplexing (OFDM) in a super-frame comprised of a plurality of time slots, wherein remaining time slots in the super-frame are used for Wideband Code Division Multiple Access (W-CDMA);
  means for determining overhead information for a plurality of streams to be sent in the time slots used for OFDM, wherein the overhead information for a particular stream indicates at least one time slot allocated to the stream in the super-frame, a transport block format that is used for the stream, and an outer code rate used for the stream;
  means for time division multiplexing the overhead information for the plurality of streams with data for the plurality of streams in the super-frame, and
  means for appending an indicator to each stream of the plurality of streams
  wherein a control channel carries the overhead information, wherein the indicator is not included in the overhead information that is carried via the control channel, wherein the indicator for a particular stream is sent in a time slot that includes data for that stream, and wherein the indicator for a particular stream indicates whether there is any change in the overhead information for the stream in an upcoming time interval.

23. The apparatus of claim 22, further comprising: means for forming a plurality of records for the time slots used for OFDM, wherein each record covers at least one time slot used for the OFDM and carries overhead information for a stream sent on the at least one time slot.

24. An apparatus comprising:
  a controller to obtain overhead information for a plurality of streams transmitted in time slots used for a first radio technology among at least two radio technologies utilized by a wireless communication system, wherein the overhead information for a particular stream indicates at least one time slot allocated to the stream, a transport block format that is used for the stream, and an outer code rate used for the stream; and
  a processor to process at least one time slot for a selected stream to obtain data for the stream, wherein the controller receives an indicator sent with the selected stream to indicate whether there is any change in the overhead information for the selected stream in an upcoming time interval, wherein the indicator for the selected stream is sent in a time slot that includes the data for the stream, wherein a control channel carries the overhead information, and wherein the indicator is not included in the overhead information that is carried via the control channel;
  wherein the first radio technology is Orthogonal Frequency Division Multiplexing (OFDM), and wherein the at least two radio technologies comprise OFDM and Wideband Code Division Multiple Access (W-CDMA).

25. The apparatus of claim 24, wherein the overhead information for each stream indicates coding and modulation used for the stream, a transport block size used for the stream, or a combination thereof.

26. The apparatus of claim 24, wherein the controller obtains information indicating the time slots used for the first radio technology.

27. The apparatus of claim 24, wherein the controller receives a plurality of records for the time slots used for the first radio technology, and wherein each record covers at least one time slot used for the first radio technology and carries overhead information for a stream sent on the at least one time slot, and wherein at least one of said plurality of records contains a stream identifier field, a transport block format field, and an outer code rate field.

28. The apparatus of claim 24, wherein the controller receives a plurality of records for the plurality of streams, and wherein each record carries overhead information for one of the plurality of streams, and wherein at least one of said plurality of records contains a stream identifier field, a transport block format field, and an outer code rate field.

29. The apparatus of claim 24, wherein the controller obtains the overhead information for the plurality of streams in each super-frame of a predetermined time duration, and wherein the processor processes the at least one time slot for the selected stream in each super-frame.

30. A method of receiving data in a wireless communication system, comprising:
   obtaining, by a wireless communication apparatus, overhead information for a plurality of streams transmitted in time slots used for a first radio technology among at least two radio technologies utilized by the wireless communication system, wherein the overhead information for a particular stream indicates at least one time slot allocated to the stream, a transport block format that is used for the stream, and an outer code rate used for the stream;
   processing, by the wireless communication apparatus, at least one time slot for a selected stream to obtain data for the stream, and
   receiving, by the wireless communication apparatus, an indicator sent with the selected stream to indicate whether there is any change in the overhead information for the selected stream in an upcoming time interval, wherein the indicator for the selected stream is sent in a time slot that includes the data for the stream;
   wherein a control channel carries the overhead information, and wherein the indicator is not included in the overhead information that is carried via the control channel; and
   wherein the first radio technology is Orthogonal Frequency Division Multiplexing (OFDM), and wherein the at least two radio technologies comprise OFDM and Wideband Code Division Multiple Access (W-CDMA).

31. The method of claim 30, further comprising: receiving a plurality of records for the overhead information for the plurality of streams; and processing a record for the selected stream to determine the at least one time slot used for the selected stream.

32. An apparatus comprising:
   means for obtaining overhead information for a plurality of streams transmitted in time slots used for a first radio technology among at least two radio technologies utilized by a wireless communication system, wherein the overhead information for a particular stream indicates at least one time slot allocated to the stream, a transport block format that is used for the stream, and an outer code rate used for the stream;
   means for processing at least one time slot for a selected stream to obtain data for the stream, and
   means for receiving an indicator sent with the selected stream to indicate whether there is any change in the overhead information for the selected stream in an upcoming time interval, wherein the indicator for the selected stream is sent in a time slot that includes the data for the stream;
   wherein a control channel carries the overhead information, and wherein the indicator is not included in the overhead information that is carried via the control channel; and
   wherein the first radio technology is Orthogonal Frequency Division Multiplexing (OFDM), and wherein the at least two radio technologies comprise OFDM and Wideband Code Division Multiple Access (W-CDMA).

33. The apparatus of claim 32, further comprising:
   means for receiving a plurality of records for the overhead information for the plurality of streams; and
   means for processing a record for the selected stream to determine the at least one time slot used for the selected stream, and wherein at least one of said plurality of records contains a stream identifier field, a transport block format field, and an outer code rate field.

34. A computer-readable non-transitory storage medium as an article of manufacture comprising instructions that are executable by a processor to:
   ascertain time slots used for a first radio technology among at least two radio technologies utilized by the wireless communication system;
   determine overhead information for a plurality of streams to be sent in the time slots used for the first radio technology, wherein the overhead information for a particular stream indicates time slots allocated to the stream, a transport block format that is used for the stream, and an outer code rate used for the stream;
   process the overhead information for the plurality of streams for transmission, and
   append an indicator to each stream of the plurality of streams;
   wherein a control channel carries the overhead information, wherein the indicator is not included in the overhead information that is carried via the control channel, wherein the indicator for a particular stream is sent in a time slot that includes data for that stream, and wherein the indicator for a particular stream indicates whether there is any change in the overhead information for the stream in an upcoming time interval; and
   wherein the first radio technology is Orthogonal Frequency Division Multiplexing (OFDM), and wherein the at least two radio technologies comprise OFDM and Wideband Code Division Multiple Access (W-CDMA).

* * * * *